United States Patent
Takahashi

(10) Patent No.: US 9,838,883 B2
(45) Date of Patent: Dec. 5, 2017

(54) NETWORK SYSTEM, ANALYSIS DEVICE, METHOD FOR PROCESSING MEASUREMENT INFORMATION, AND RECORDING MEDIUM

(71) Applicant: NEC Corporation, Tokyo (JP)

(72) Inventor: Gen Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/121,306

(22) PCT Filed: Feb. 27, 2015

(86) PCT No.: PCT/JP2015/001045
§ 371 (c)(1),
(2) Date: Aug. 24, 2016

(87) PCT Pub. No.: WO2015/133108
PCT Pub. Date: Sep. 11, 2015

(65) Prior Publication Data
US 2017/0019795 A1   Jan. 19, 2017

(30) Foreign Application Priority Data

Mar. 7, 2014  (JP) ................. 2014-045676

(51) Int. Cl.
*H04W 16/18* (2009.01)
*H04L 12/26* (2006.01)
(Continued)

(52) U.S. Cl.
CPC .......... *H04W 16/18* (2013.01); *H04L 43/065* (2013.01); *H04W 24/02* (2013.01); *H04W 24/10* (2013.01)

(58) Field of Classification Search
CPC ...... H04W 16/18; H04W 24/10; H04W 24/02
See application file for complete search history.

(56) References Cited

U.S. PATENT DOCUMENTS

2003/0096606 A1   5/2003   Inman et al.
2005/0130645 A1   6/2005   Dobson et al.
(Continued)

FOREIGN PATENT DOCUMENTS

JP   2007-088569 A   4/2007
JP   2008-271141 A   11/2008
(Continued)

OTHER PUBLICATIONS

International Search Report corresponding to PCT/JP2015/001045, dated May 12, 2015, 2 pages.
(Continued)

*Primary Examiner* — Nam Huynh
(74) *Attorney, Agent, or Firm* — Wilmer Cutler Pickering Hale and Dorr LLP

(57) ABSTRACT

The present invention ensures the reliability of measurement information about a cell measured by mobile terminals and enables the measurement information to be utilized for the optimization of a mobile communication network. An analysis device acquires measurement information about a reception signal state measured by a measuring instrument, acquires, together with terminal type information, measurement information about a reception signal state measured by mobile terminals, statistically processes the measurement information of the measuring instrument and the measurement information of the mobile terminals for each terminal type to generate respective typical data, groups similar pieces of the typical data of the measuring instrument and the typical data of the mobile terminals for each terminal type into the same group, and generates a measurement representative value distribution on the basis of the distribution of the typical data included in the same group and the distribution of terminal types in the group.

28 Claims, 20 Drawing Sheets

(51) Int. Cl.
*H04W 24/02* (2009.01)
*H04W 24/10* (2009.01)

(56) References Cited

U.S. PATENT DOCUMENTS

| | | |
|---|---|---|
| 2007/0195696 A1 | 8/2007 | Dobson et al. |
| 2007/0254644 A1 | 11/2007 | Dobson et al. |
| 2010/0015926 A1 | 1/2010 | Luff |
| 2012/0113837 A1 | 5/2012 | Siomina et al. |
| 2014/0194109 A1* | 7/2014 | Nunzi ............... H04W 24/08 455/418 |

FOREIGN PATENT DOCUMENTS

| | | |
|---|---|---|
| JP | 2010-178022 A | 8/2010 |
| JP | 2013-038583 A | 2/2013 |
| JP | 5591980 B1 | 9/2014 |
| WO | WO-2011/037214 A1 | 3/2011 |

OTHER PUBLICATIONS

Written Opinion of International Search Authority corresponding to PCT/JP2015/001045, dated May 12, 2015, 5 pages.

3GPP TS 37.320 v0.7.0, (Jun. 2010), 3rd Generation Partnership Project; Technical Specification Group TSG RAN Universal Terrestrial Radio Access (UTRA) and Evolved Universal Terrestrial Radio Access (E-UTRA); "Radio measurement collection for Minimization of Drive Tests (MDT)", Overall description; Stage 2; (Release 10); Jun. 2010, 15 pages.

3GPP TR 36.902, v9.3.1 (Mar. 2011), 3rd Generation Partnership Project; Technical Specification Group Radio Access Network; Evolved Universal Terrestrial Radio Access Network (E-UTRAN); "Self-configuring and self-optimizing network (SON) use cases and solutions" (Release 9), Mar. 2011, 21 pages.

Extended European Search Report issued by the European Patent Office for European Application No. 15759259.3 dated Jul. 25, 2017 (8 pages).

* cited by examiner

| Time | GPS Lon | GPS Lat | MEQ1_PCI | MEQ1_distance | MEQ1_RSRP | MEQ1_RSRQ | ... |
|---|---|---|---|---|---|---|---|
| 2013-09-30 10:55:08 | 139.58137 | 35.49634 | 125 | 265 | −80.65 | −25.21 | |
| 2013-09-30 10:55:09 | 139.58134 | 35.49633 | 120 | 254 | −70.14 | −11.49 | |
| 2013-09-30 10:55:11 | 139.58132 | 35.49632 | 95 | 310 | −63.59 | −26.27 | |
| 2013-09-30 10:55:12 | 139.58130 | 35.49631 | 90 | 281 | −54.65 | −13.07 | |
| 2013-09-30 10:55:13 | 139.58128 | 35.49630 | 50 | 313 | −70.9 | −8.74 | |
| 2013-09-30 10:55:14 | 139.58127 | 35.49629 | 40 | 340 | −101.08 | −6.56 | |

(B)

| MEQK_PCI | MEQK_distance | MEQK_RSRP | MEQK_RSRQ | ... | MDTi-1_PCI | MDTi-1_distance | MDTi-1_RSRP | MDTi-1_RSRQ | MDTi-2_PCI | ... |
|---|---|---|---|---|---|---|---|---|---|---|
| 125 | 265 | −80.65 | −25.21 | | 77 | 298 | −60.57 | −10.21 | 186 | |
| 120 | 254 | −70.14 | −11.49 | | 77 | 265 | −77.21 | −11.34 | 184 | |
| 95 | 310 | −63.59 | −26.27 | | 84 | 234 | −81.03 | −20.76 | 184 | |
| 90 | 281 | −54.65 | −13.07 | | 84 | 311 | −67.56 | −17.01 | 222 | |
| 50 | 313 | −70.9 | −8.74 | | 84 | 223 | −62.42 | −24.1 | 234 | |
| 40 | 340 | −101.08 | −6.56 | | 82 | 312 | −70.36 | −12.5 | 241 | |

(C)

| MDTJ-K_PCI | MDTJ-K_distance | MDTJ-K_RSRP | MDTJ-K_RSRQ | ... |
|---|---|---|---|---|
| 198 | 224 | −71.91 | −11.76 | |
| 196 | 203 | −77.11 | −18.43 | |
| 196 | 315 | −66.68 | −17.15 | |
| 198 | 330 | −81.77 | −9.67 | |
| 198 | 230 | −69.89 | −12.87 | |
| 194 | 290 | −75.20 | −10.21 | |

Fig.17

| TERMINAL IDENTIFICATION INFORMATION | TERMINAL TYPE NUMBER |
|---|---|
| 88000237 | TERMINAL 1 |
| 88000258 | TERMINAL 2 |
| 01444200 | TERMINAL 3 |
| 01344000 | TERMINAL 4 |

⋮ ⋮

| 44586002 | TERMINAL J |

Fig.18

|       | MDT1     | MDT2     | MDT3     | MDT4     | MDTJ     | MEQ1 |
|-------|----------|----------|----------|----------|----------|------|
| MDT1  | 1        |          |          |          |          |      |
| MDT2  | 0.885545 | 1        |          |          |          |      |
| MDT3  | 0.621556 | 0.641548 | 1        |          |          |      |
| MDT4  | 0.654245 | 0.568225 | 0.880522 | 1        |          |      |
| MDTJ  | 0.454216 | 0.650526 | 0.226606 | 0.246062 | 1        |      |
| MEQ1  | 0.624815 | 0.610882 | 0.662154 | 0.866258 | 0.565642 | 1    |

Fig.19

| GROUP | MDT1 | MDT2 | MDT3 | MDT4 | | MDTJ |
|---|---|---|---|---|---|---|
| c=1 | 364 | 1203 | 943 | 1071 | ... | 1487 |
| c=2 | 387 | 591 | 1354 | 872 | | 1448 |
| Total | 751 | 1794 | 2297 | 1943 | | 2935 |

```
LOG DATA SPECIFYING PAGE

MEASURING INSTRUMENT
LOG DATA:              [                    ]

TERMINAL LOG DATA:     [                    ]

....

[RETURN TO TOP]        [BACK]          [NEXT]
```

(B)

```
ANALYSIS CONDITION INPUT PAGE

GROUPING CORRELATION COEFFICIENT    [        ]
    THRESHOLD (rth) INPUT:

GROUPING VARIATION COEFFICIENT      [        ]
    THRESHOLD (CVth) INPUT:

MEASUREMENT GROUP DOMINATION        [        ]
    RATE THRESHOLD (Cth) INPUT:

....

[RETURN TO TOP]        [BACK]          [NEXT]
```

NETWORK SYSTEM, ANALYSIS DEVICE, METHOD FOR PROCESSING MEASUREMENT INFORMATION, AND RECORDING MEDIUM

CROSS-REFERENCE TO RELATED APPLICATIONS

This application is a national stage application of International Application No. PCT/JP2015/001045 entitled "NETWORK SYSTEM, ANALYSIS DEVICE, METHOD FOR PROCESSING MEASUREMENT INFORMATION, AND RECORDING MEDIUM," filed on Feb. 27, 2015, which claims the benefit of the priority of Japanese Patent Application No. 2014-045676 filed on Mar. 7, 2014, the disclosures of each of which are hereby incorporated by reference in their entirety.

TECHNICAL FIELD

The present invention relates to a network system, an analysis device, a method for processing measurement information, and a recording medium.

BACKGROUND ART

In a mobile communication system, for information collection of parameter settings (e.g. an antenna tilt angle, transmission power, and a hand over parameter) in accordance with an installation environment of a base station and the like, a running test (drive test) or the like, for example, using a dedicated measuring instrument is performed. In the running test, using a measuring vehicle mounted with measuring equipment (e.g. a measuring instrument (radio wave measuring device) and a PC (Personal Computer) provided with a position information acquisition function) (or a measurement worker carrying a measuring device), radio wave measurement information such as received power, necessary position information, and the like are collected, and in a base station, a designated management device, or the like, information necessary for quality management of a cell area and the like are acquired. This drive test is well known for its many man-hours and high operation cost. In 3GPP (3rd Generation Partnership Project), specification development of MDT (Minimization of Drive Test) that is a technique in which collection of a wireless environment and position information is automated using a wireless terminal carried by a user has been progressing (refer to NPL 1). In a "Logged MDT" that is one form of MDT, for example, a UE (User Equipment) of an "Idle Mode" measures a wireless environment (specifically, e.g. a received power and a received quality of a Reference Signal), also acquires position information of a spot where the measurement has been performed using a GNSS (Global Navigation Satellite System) function such as GPS (Global Positioning System) or the like mounted on the UE, and logs a measurement result and the position information (further, measurement time information and the like). The UE transmits, upon transition, for example, from the Idle Mode to a connection state, the held Log data to a base station as a Measurement Report.

Further, an SON (Self-configuring and self-Optimizing Network) function of a network based on measurement information of a terminal is standardized (NPL 2). In SON, a terminal of a subscriber collects information of received qualities of peripheral base stations and problems of a communication quality of the past, instead of a measuring instrument. A base station collects traffic loads, problems of a communication quality of the past, parameter setting information, and the like. A part of pieces of the collected measurement information is shared among the peripheral base stations directly or via a network monitoring system. On the basis of a statistical analysis result of these pieces of the measurement information, setting environments of the base stations and the presence or absence of a problem of communication quality are determined, and parameters for each base station are updated on a network side. In this manner, optimization of a wireless access network is automated, which makes man-hour reduction, cost reduction, and network operation efficiency possible.

PTL 1 describes a problem that upon measurement using a terminal, since quality information (a reception level and a change in bit error rate) is collected assuming that a terminal (mobile station) is connectable to a mobile communication network, it is difficult to sufficiently collect information necessary for designing an area managed by a base station. For this problem, PTL 1 discloses a configuration in which a terminal includes a communication status information generation unit that generates, when the mobile station is unable to connect to a mobile communication network, communication status information including at least a cause (connection difficulty cause) for not being able to connect to the mobile communication network so as to be able to grasp a time zone and a position in which the mobile station is unable to connect to the mobile communication network.

Further, PTL 2 discloses a control device that tabulates, for each wireless cell, communication qualities reported from a plurality of mobile terminals each including a function for measuring and reporting a communication quality of a wireless line and generates histogram information. Further, disclosed with this control device is a system including a management device that acquires the generated histogram information and determines normality of communication for the each wireless cell via statistical processing based on a plurality of quality indexes from the histogram information. Having reliability is a prerequisite for measurements at the terminals for network adjustments assumed in PTL 2.

CITATION LIST

Patent Literature

[PTL 1] Japanese Laid-open Patent Publication No. 2008-271141
[PTL 2] Japanese Laid-open Patent Publication No. 2007-088569

Non Patent Literature

[NPL 1] 3GPP TS 37.320 v0.7.0, "Radio measurement collection for Minimization of Drive Tests (MDT)", 2010-06
[NPL 2] 3GPP TR 36.902, v9.3.1, "Self-configuring and self-optimizing network (SON) use cases and solutions (Release 9)", 2011-03

SUMMARY OF INVENTION

Technical Problem

Related techniques will be analyzed below. As described in NPL 1 and 2, an optimization function based on measurement values of terminals and the like are standardized, but specific implementation depends on vendors. Upon optimization of a network such as a wireless access network or the like based on analysis of measurement information collected in a Measurement Report from a UE, individual implementation is performed, for example, for an analysis manner of measurement information.

For a received power and the like measured in a UE, reliability of the measurement is lower than measurement reliability in a dedicated measuring instrument. Therefore, when a network is optimized using measurement information collected from the UE, the optimization of the network is not always guaranteed. On the other hand, the optimization of the network is intended to realize an improvement of a quality (experience quality of a user) in the UE.

Therefore, when a communication carrier or the like optimizes a network using measurement information measured in a dedicated measuring instrument, there is a possibility of optimizing the network without considering reception characteristic data corresponding to a user experience in the UE. In other words, the optimization of the network may not directly improve the quality in the UE. Further, in the optimization of the network performed on the basis of only measurement information measured by the dedicated measuring instrument, influences of a difference in reception characteristic or the like for each UE type (model type), behaviors of UEs, a distribution (population distribution) of the UE types on the network are not at all considered.

As far as the present inventor knows, a fact is that there has not yet been realized a means, a system, or the like that solves a problem of reflecting the measurement information to optimization setting or the like of a network (mobile communication network) while ensuring reliability of measurement information measured by a UE.

Accordingly, the present invention has been created in view of the problem, and a main object of the present invention is to provide a method, a device, a system, and a program that ensure reliability for measurement information of a cell measured by mobile terminals to enable the measurement information to be used for optimizing a mobile communication network.

Solution to Problem

According to an aspect of the present invention, a method for processing measurement information of network, including: acquiring measurement information of a reception signal state measured by a measuring instrument; acquiring, together with terminal type information, measurement information of a reception signal state measured by mobile terminals; statistically processing the measurement information of the measuring instrument and the measurement information of the mobile terminals for each terminal type; generating respective typical data; grouping similar pieces of the typical data of the measuring instrument and the typical data of the mobile terminals for each terminal type into the same group; and generating a distribution of measurement representative values on the basis of a distribution of the typical data included in the same group and a distribution of the terminal types in the group, is provided (first point of view).

According to another aspect of the present invention, an analysis device including: a typical data creation means configured to acquire measurement information of a reception signal state measured by a measuring instrument, acquire, together with terminal type information, measurement information of a reception signal state measured by mobile terminals, statistically process the measurement information of the measuring instrument and the measurement information of the mobile terminals for each terminal type, generate respective typical data, and group similar pieces of the typical data of the measuring instrument and the typical data of the mobile terminals for each terminal type into the same group; and a measurement representative value generation means configured to generate a distribution of measurement representative values on the basis of a distribution of the typical data included in the same group and a distribution of the terminal types in the group, is provided (second point of view).

According to another aspect of the present invention, a mobile communication network system including: mobile terminals; a base station wirelessly communicating with the mobile terminals; and the analysis device according to the first point of view communicably connected to the base station, is provided (third point of view).

According to moreover another aspect of the present invention, a computer-readable, non-transitory recording medium (semiconductor storage device or magnetic/optical storage device) recording a program causing a computer to execute: typical data creation processing for acquiring measurement information of a reception signal state measured by a measuring instrument, acquiring, together with terminal type information, measurement information of a reception signal state measured by mobile terminals, statistically processing the measurement information of the measuring instrument and the measurement information of the mobile terminals for each terminal type, generating respective typical data, and grouping similar pieces of the typical data of the measuring instrument and the typical data of the mobile terminals for each terminal type into the same group; and measurement representative value generation processing for generating a distribution of measurement representative values on the basis of a distribution of the typical data included in the same group and a distribution of the terminal types in the group, is provided.

According to moreover another aspect of the present invention, a method for processing measurement information of network (analysis device), including: acquiring measurement information of a reception signal state measured by a measuring instrument, acquiring, together with terminal type information, measurement information of a reception signal state measured by mobile terminals, statistically processing the measurement information of the measuring instrument and the measurement information of the mobile terminals for each terminal type, generating respective typical data, and grouping similar pieces of the typical data of the measuring instrument and the typical data of the mobile terminals for each terminal type into the same group; and generating a distribution of measurement representative values on the basis of a distribution of the typical data included in the same group and a distribution of the terminal types in the group, is provided.

Advantageous Effects of Invention

According to the present invention, reliability for measurement information of a cell measured by mobile terminals is ensured and then the measurement information can be used for optimizing a mobile communication network.

BRIEF DESCRIPTION OF DRAWINGS

FIG. 16 is a diagram exemplifying one example of a data structure (storage format).

FIG. 17 is a diagram exemplifying terminal identification information.

FIG. 18 is a diagram exemplifying a correlation coefficient.

FIG. 19 is a diagram exemplifying a population distribution of terminals.

FIG. 20(A) is a diagram exemplifying a measurement data setting screen, and FIG. 20(B) is a diagram exemplifying an analysis condition input screen.

DESCRIPTION OF EMBODIMENTS

Figure 15:
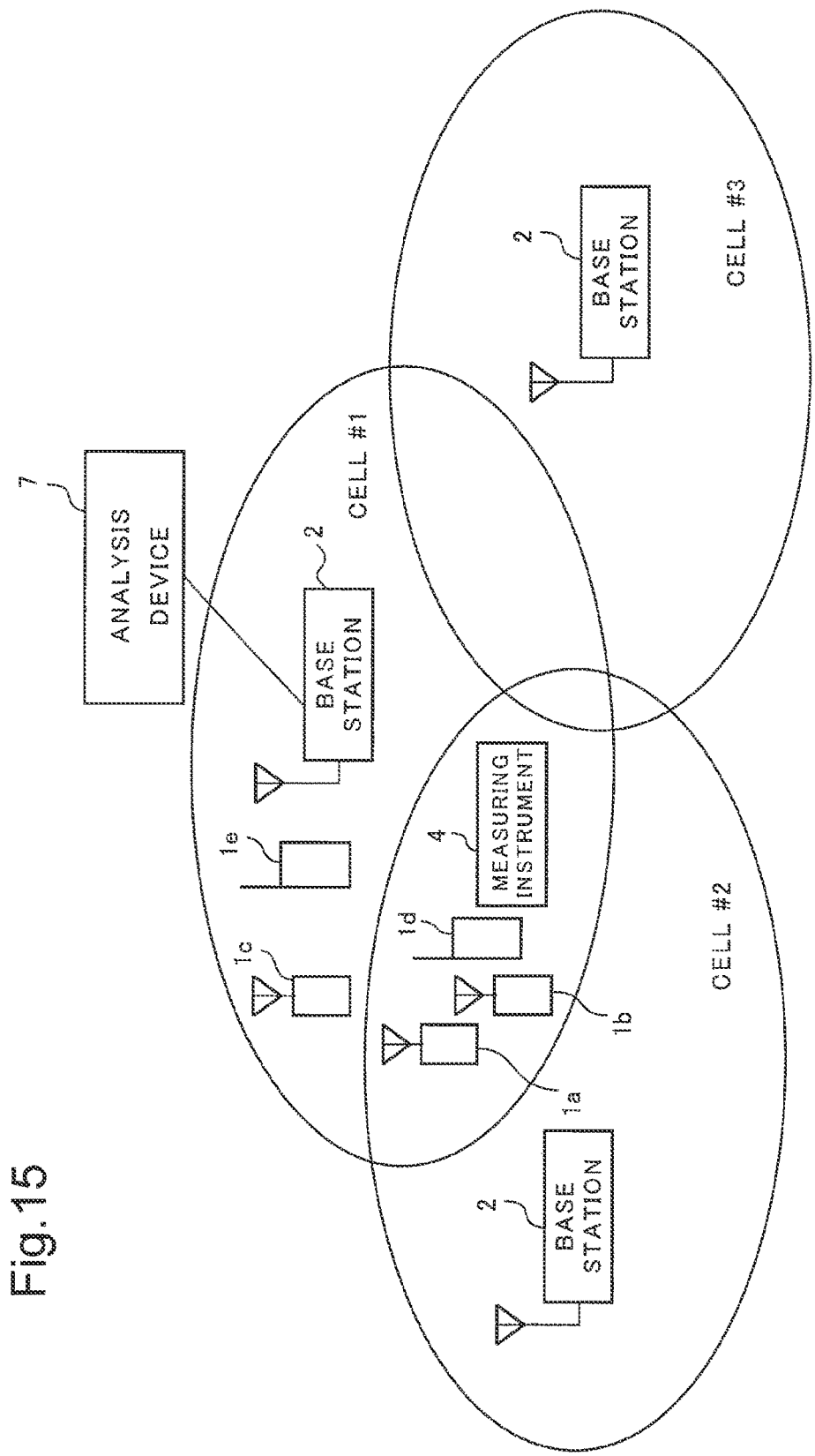
FIG. 15 is a diagram illustrating an invention concept.

An outline (fundamental concept) of the present invention will be described. According to one aspect of the present invention to be disclosed, referring to FIG. 15, an analysis device 7 acquires measurement information of a reception signal state measured by a measuring instrument 4 and acquires measurement information of a reception signal state measured by mobile terminals 1, together with terminal type information (for example, mobile terminals 1a, 1b, and 1c of FIG. 15 have the same type (model type), and mobile terminals 1d and 1e have different terminal types (also different from 1a to 1c)). The analysis device 7 statistically processes the measurement information of the measuring instrument 4 and the measurement information of the mobile terminals 1 (1a to 1e) for each terminal type and generates respective typical data. The analysis device 7 groups similar pieces of the typical data of the measuring instrument and the typical data of the mobile terminals for each terminal type into the same group. Further, the analysis device 7 generates a distribution of measurement representative values on the basis of a distribution of the typical data in the same group and a distribution (population distribution) of the terminal types (the terminal types of the mobile terminals and the measuring instrument) in the group. The analysis device 7 derives an appropriate (optimum) setting value of a network setting value (not specifically limited, and, for example, at least one of a transmission power of a base station, an antenna tilt angle, an antenna azimuth angle, or a hand over parameter), on the basis of the generated measurement representative value distribution. The analysis device 7 sets the derived setting value for, for example, an eNodeB (evolved NodeB) or an RNC (Radio Network Controller). In FIG. 15, simply for convenience of drawing preparation, as terminals in a cell #1, five units are exemplified. Further, cells #2 and #3 adjacent to the cell #1 and a base station 2 that controls each of the cells are exemplified. It goes without saying that the analysis device 7 may acquire measurement information based on terminals (not illustrated) located in the cells #2 and #3 from the base stations 2 of the cells #2 and #3.

According to one aspect of an exemplary embodiment, the analysis device 7 collects measurement information from the measuring instrument 4 and the mobile terminals 1, stores the collected measurement information on a storage device as a specific data structure, and processes the stored measurement information. Upon the processing, one measurement information row (entry) includes a measurement point (a cell ID, a distance from a base station, or the like) by being associated with a number of times of measurements and a column (or a field) of measurement information (e.g. a received power or received quality) at the measurement point. Further, in chronological order (in a column direction), an array-type data structure including a plurality of the rows is stored on the storage device by being associated with the measuring instrument and the terminal types of the mobile terminals. One aspect of the exemplary embodiment may be configured as described above. The analysis device 7 determines, as the typical data, for example, an average value of a predetermined specific number of pieces of measurement information satisfying a condition where a statistical characteristic in a chronological interval is previously determined among pieces of measurement information of a plurality of numbers of times stored in a certain row of the data structure on the storage device. This processing may be executed in association with the measuring instrument and each of the terminal types of the mobile terminals. In this manner, the typical data of the measuring instrument and the typical data of the mobile terminals for each terminal type are generated. According to one aspect of the exemplary embodiment, the measurement point may be identified by a sector obtained by dividing a cell controlled by a base station or a distance from the base station.

According to one aspect of the exemplary embodiment, the analysis device 7 may synthesize a distribution of the measurement representative values on the basis of a distribution of the typical data of the same group and a population distribution of the terminal types in the group.

According to one aspect of the exemplary embodiment, upon creating the typical data, the analysis device 7 may calculate an average value and a standard deviation (variance) of a specific number (a predetermined chronological interval) of pieces of measurement information stored in the same column in the data structure, for each row of the data structure, extract a predetermined specific number (L1) of columns in which the average value and the standard deviation (variance) of a specific number of pieces of measurement information stored in different rows of the same column fall within predetermined specific ranges, respectively, from measurement information of a plurality of numbers of times stored in the same row, execute processing for determining an average value of pieces of measurement information of the specific number of columns as typical data corresponding to the row by being associated with the measuring instrument and the terminal types of the mobile terminals, generate typical data of the measuring instrument and typical data of the mobile terminals for each terminal type, calculate a correlation coefficient of the typical data between the measuring instrument and the terminal types of the mobile terminals, and group, when the correlation coefficient is equal to or larger than a predetermined threshold, the typical data into one group.

According to one aspect of the exemplary embodiment, the analysis device 7 may handle at least one mobile terminal of a plurality of the mobile terminals as the measuring instrument and process, as measurement information of the measuring instrument, measurement information of a reception signal state measured by the at least one mobile terminal.

According to one aspect of the exemplary embodiment, the analysis device 7 may handle the measuring instrument as a mobile terminal further different in terminal type (i.e. determine the measuring instrument as one type of mobile terminal) and process measurement information of a reception signal state measured by the measuring instrument as measurement information of the mobile terminal further different in terminal type. In this case, the invention of the sixth point of view described above is provided.

According to one aspect of the exemplary embodiment, the analysis device 7 may handle the mobile terminal grouped into the same group as the measuring instrument as the measuring instrument and use the typical data of the measuring instrument as the typical data of the mobile terminal.

According to one aspect of the exemplary embodiment, the analysis device 7 may calculate, when grouping similar pieces of the typical data of the measuring instrument and the typical data of the mobile terminals for each terminal type into the same group, a correlation coefficient of the typical data between the measuring instrument and the terminal types of the mobile terminals and determine the typical data as the same group when the correlation coefficient is equal to or larger than a predetermined first threshold and further when a variation coefficient is equal to or smaller than a predetermined second threshold, According to the exemplary embodiment, the analysis device 7 handles a terminal type in which typical data of measurement information in a cell area (service area) controlled by a base station or an area (sector) obtained by dividing the cell area into a plurality of parts are correlated with typical data of measurement information of a measuring instrument in the area, as the same group as the measuring instrument. Further, the analysis device 7 determines, as the same group, a plurality of terminal types in which a correlation coefficient of typical data of measurement information is equal to or larger than a specific value.

The analysis device 7 creates a population distribution of terminal types and determines, when a domination rate of a group to which the measuring instrument belongs (a ratio of a distribution of the group) exceeds a predetermined specific value, a measurement value of the group to which measurement information of the measuring instrument belongs as the measurement representative value. On the other hand, when a domination rate of a group to which the measuring instrument belongs is equal to or smaller than the predetermined specific value, the device determines an average value and a standard deviation of the typical data of the terminal types for each group, synthesizes a frequency distribution in accordance with the population distribution of the terminal types in the group, and generates a distribution of the measurement representative values. Using the measurement representative value distribution, the analysis device 7, for example, derives a parameter setting value for optimizing a network. Therefore, the analysis device 7 considers a difference in reception characteristic or the like for respective types (model types) of terminals, an influence on a network caused by a distribution of the terminals, and the like and can thereby ensure reliability of measurement data obtained by the terminals. In other words, network optimization can be performed by appropriately corresponding to, for example, characteristics of a terminal or the like used by a user. As a result, for example, in a terminal, a reception characteristic corresponding to a user experience can be improved. Hereinafter, description will be made on the basis of an exemplary embodiment.

Figure 1:
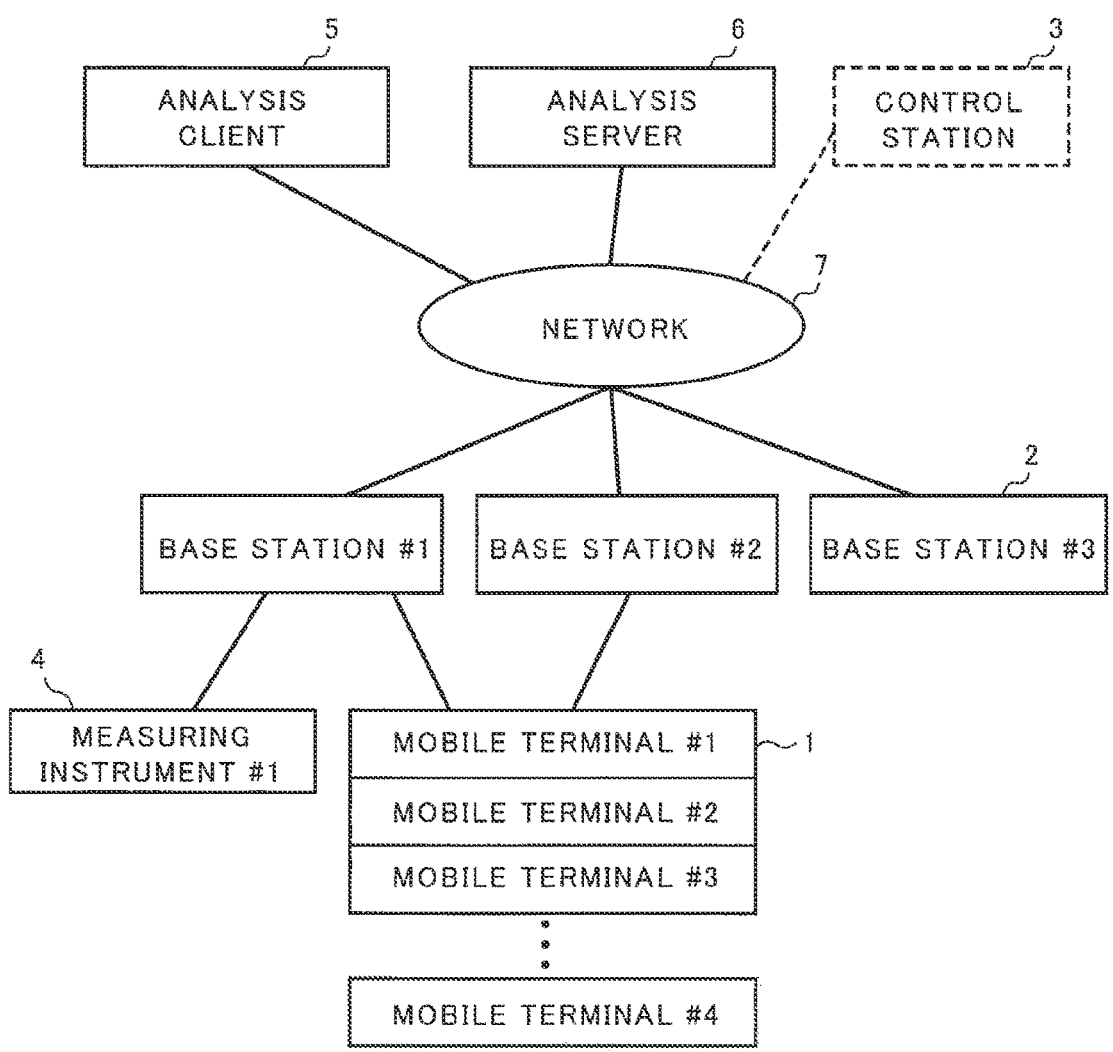
FIG. 1 is a diagram exemplifying a system configuration of one exemplary embodiment of the present invention.

FIG. 1 is a diagram exemplifying a system configuration of one exemplary embodiment. A system of the present exemplary embodiment includes a mobile terminal 1, a base station 2, a control station 3, a measuring instrument 4, an analysis client 5, an analysis server 6, and a network 7. The base station 2, the control station 3, the analysis client 5, and the analysis server 6 are connected together to the network 7. In the example illustrated in FIG. 1, while an analysis system (corresponding to an analysis device 7 of FIG. 15) has a client/server configuration and has a configuration separate from the base station 2 and the control station 3, it goes without saying that the analysis system is not limited to such a configuration and may be implemented on the base station 2, the control station 3 or the like. Further, it goes without saying that numbers of units of the base station 2, the mobile terminal 1, the measuring instrument 4, and the like are not limited to the numbers illustrated in FIG. 1. The network 7 may be an EPC (Evolved Packet Core) core network in LTE (Long Term Evolution). In this case, the analysis client 5 and the analysis server 6 connected to the network 7 may be connected to the core network, or may be configured to be connected to a packet data network connected to a PGW (PDN (Packet Data Network) Gateway) of the core network. Further, in UTRAN (UMTS (Universal Mobile Telecommunications System) Terrestrial Radio Access Network)/W-CDMA (Wideband Code Division Multiple Access) or the like, the base station (NodeB) 2 and the control station (RNC: Radio Network Controller) 3 are disposed separately, but in LTE, the base station 2 (eNode B: evolved NodeB) includes a function of the control station (RNC). In the present exemplary embodiment, any one of the configurations is applicable.

The measuring instrument 4 measures a received power, a received quality, and the like. The mobile terminal 1 measures a received power, a received quality, and the like and transmits measurement information and position information, measurement time information, terminal identification information, and the like to the analysis client 5 or the analysis server 6 via the base station 2.

When receiving a request for network optimization from the analysis client 5, the analysis server 6 statistically processes measurement information collected from the measuring instrument 4 and the mobile terminal 1 and creates typical data of the measuring instrument 4 and the mobile terminal 1 for each type (model type).

The analysis server 6 groups pieces of the typical data in which a reception characteristic is similar on the basis of a correlation among the pieces of the typical data for each terminal type.

The analysis server 6 synthesizes a distribution (frequency distribution) on the basis of a distribution (e.g. an average value and a standard deviation of pieces of typical data included in a group) of pieces of the typical data included in the same group and a population distribution of the terminal types of the mobile terminals in the group and determines the synthesized distribution as a distribution of measurement representative values.

The analysis server 6 calculates an appropriate value of a network setting value on the basis of the distribution of the measurement representative values and outputs the calculated value.

Figure 2:
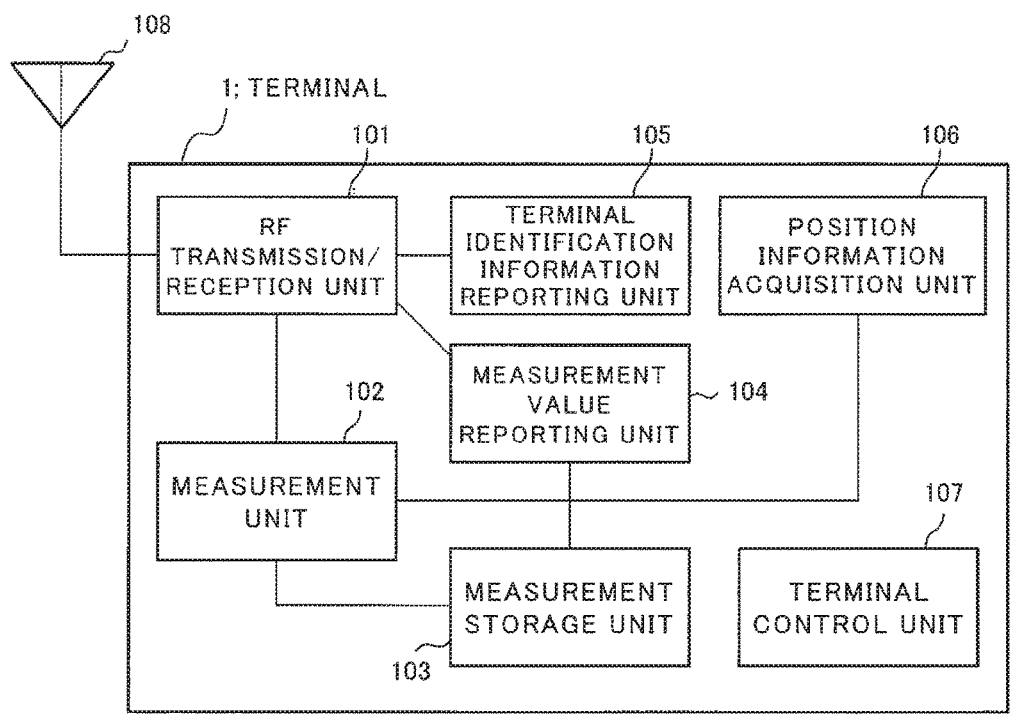
FIG. 2 is a diagram exemplifying a configuration of a terminal of one exemplary embodiment of the present invention.

FIG. 2 is a diagram schematically illustrating a configuration example of the mobile terminal 1 of FIG. 1. Referring to FIG. 2, the mobile terminal (terminal) 1 includes an RF transmission/reception unit 101 that performs transmission/reception of an RF (Radio Frequency), a measurement unit 102 that determines a received power and a received quality from a reception signal received in the RF transmission/reception unit 101, a measurement storage unit 103, a measurement value reporting unit 104 that reports a measurement report including measurement values of a received power and a received quality and position information stored on the measurement storage unit 103, a terminal identification information reporting unit 105 that reports terminal identification information (e.g. information equivalent to an IMEI (International Mobile Equipment Identity in 3GPP), a position information acquisition unit 106 such as a GPS (Global Positioning System) reception function or the like, a terminal control unit 107 that controls terminal operations, and an antenna 108. The IMEI is a 15-digit number and includes a TAC (Type Approval Code) of 6 digits, an FAC (Final Assembly Code) of 2 digits, an SNR (Serial Number) of 6 digits, and a check code of one digit.

The RF transmission/reception unit 101 is a wireless unit that receives a signal from the antenna 108 and transmits a transmission signal from the antenna 108 and has a well-known configuration. In other words, a reception unit (not illustrated) of the RF transmission/reception unit 101 filter-processes, for example, an IF (Intermediate Frequency) signal obtained by causing an RF signal received in the antenna 108 to be subjected to low noise amplification using an LNA (Low Noise Amplifier), not illustrated, and frequency conversion (down-convert) using a mixer, not illustrated, and outputs an analog baseband signal. A transmission unit (not illustrated) of the RF transmission/reception unit 101 power-amplifies, using a transmission power amplifier, not illustrated, an RF signal obtained by frequency conversion (up-convert) of a transmission analog baseband signal using a mixer, not illustrated, and wirelessly transmits the amplified signal from the antenna 108.

The measurement unit 102 converts a reception signal (e.g. a reception analog baseband signal) output from the RF transmission/reception unit 101 to a digital signal using, for example, an ADC (Analog to Digital Convertor), not illustrated, determines an RSRP (Reference Signal Received Power) and an RSRQ (Reference Signal Received Quality), and the like, and stores the determined power and quality on the measurement storage unit 103. The measurement unit 102 measures, for example, RSRPs of a serving cell (e.g. the cell #1 of FIG. 15) and adjacent cells (e.g. the cell #2 and the cell #3 of FIG. 15). The RSRQ is given by N×(RSRP/RSSI). The RSSI (Received Signal Strength Indicator) is a total of received powers of all signals such as a desired signal from a serving cell, interference signals from adjacent cells, a noise signal due to thermal noise, and the like. N is a number of RBs (Resource Blocks) of a measurement band.

In the case of LTE, as described in, for example, NPL 1, the mobile terminal 1 of RRC (Radio Resource Control) _Connected) receives a measurement instruction message (Idle MDT Configuration message in the case of Logged MDT) from the base station 2 side. In the case of Logged MDT, measurement items include, for example, a measurement frequency, and a RSCP (Received Signal Code Power) and Ec/No (a received energy per chip obtained by division by a power density in a band) in UTRA (UMTS Terrestrial Radio Access: W-CDMA) or an RSRP and an RSRQ in EUTRA (Evolved UMTS Terrestrial Radio Access: LTE). The measurement instruction message from the base station 2 side may also specify a measurement period.

The measurement unit 102 of the mobile terminal 1 receives an instruction from the terminal control unit 107, and when the mobile terminal 1 measures a received power and a received quality at a certain spot, the measurement unit 102 records the measurement values on the measurement storage unit 103 as a LOG, together with position information of the spot acquired in the position information acquisition unit 106 and network time stamp information. The mobile terminal 1 reports information indicating that measurement information measured in an Idle state is usable to the base station 2 and the like, for example, upon RRC (Radio Resource Control)_Connection Establishment, and the measurement value reporting unit 104 reports the measurement values on the basis of an instruction from the base station 2 side. Although being not specifically limited, the network time stamp information is adjusted, using a protocol for synchronizing pieces of time information of devices connected to a network, to the same time between the devices. Further, the mobile terminal 1 adjusts a time on the basis of information from, for example, an in-zone (serving) base station.

Figure 3:
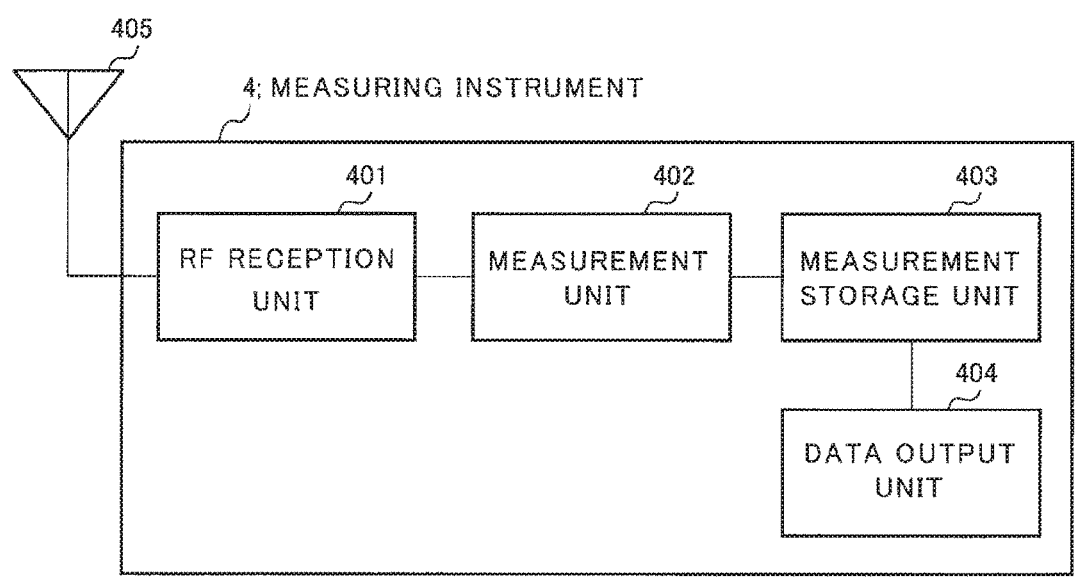
FIG. 3 is a diagram exemplifying a configuration of a measuring instrument of one exemplary embodiment of the present invention.

FIG. 3 is a diagram schematically illustrating a configuration example of the measuring instrument 4 of FIG. 1. Referring to FIG. 3, the instrument includes an RF reception unit 401, a measurement unit 402, a measurement storage unit 403, a data output unit 404, and an antenna (reception antenna) 405. For the RF reception unit 401, a well-known configuration used for a measuring instrument that measures reception radio waves may be used. An analog baseband signal in which an IF signal obtained by causing, for example, an RF signal received by the reception antenna 405 to be subjected to low noise amplification using an LNA, not illustrated, and frequency conversion (down-convert), not illustrated, is filter-processed is output. The measurement unit 402 converts the reception analog baseband signal from the RF reception unit 401 to a digital signal, determines, for example, an RSRP and an RSRQ, and stores the determined RSRP and RSRQ on the measurement storage unit 403. Although being not specifically limited, the data output unit 404 may include, for example, a USB (Universal Serial Bus) interface. In this case, the data output unit 404 outputs measurement information stored on the measurement storage unit 403 to a PC or the like that is not illustrated. Alternatively, the data output unit 404 may be configured to transmit measurement information to the analysis client 5 through the base station 2 in the same manner as the mobile terminal 1 via an RF transmission unit and an antenna (transmission antenna) that are not illustrated.

Figure 4:
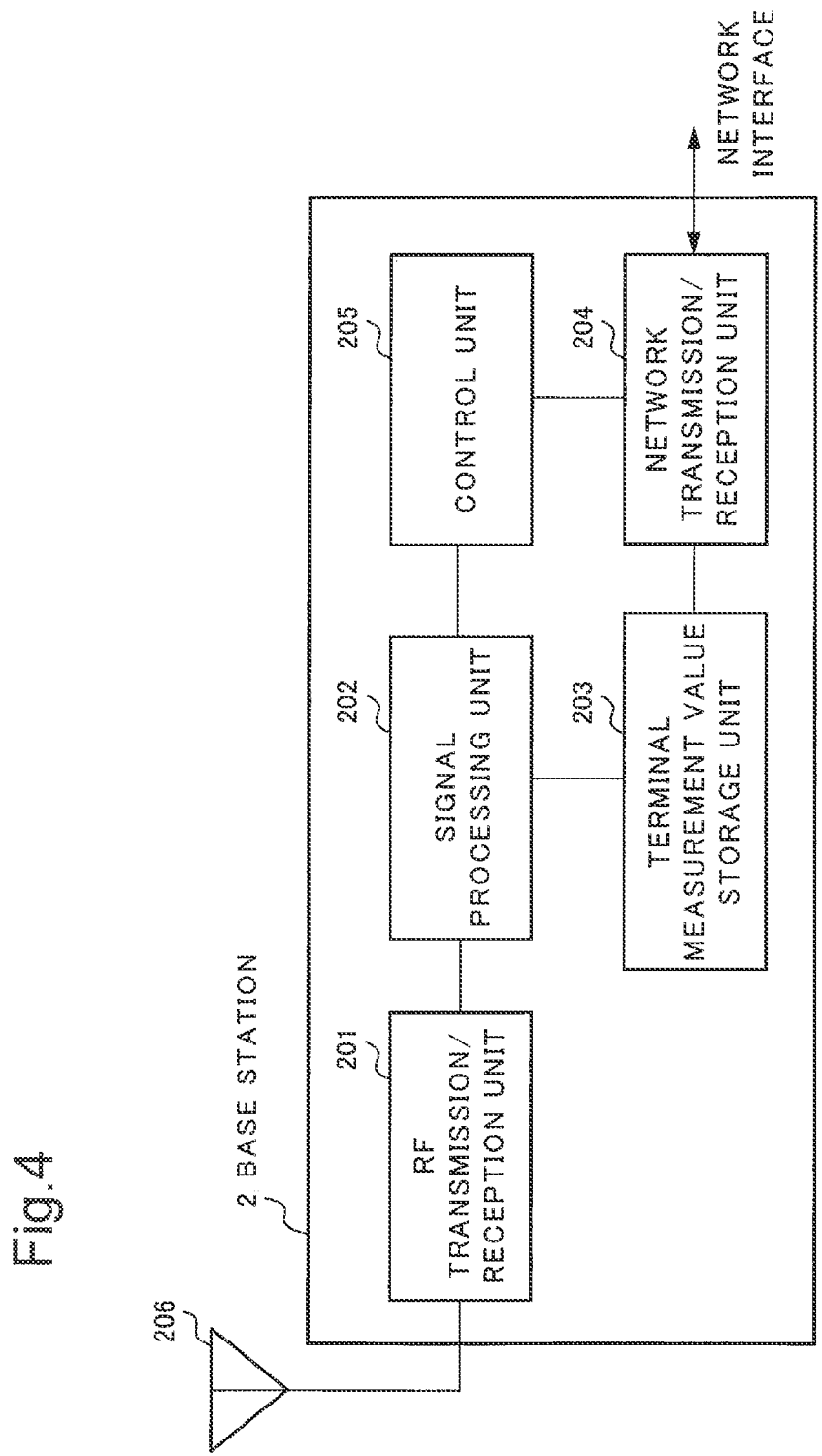
FIG. 4 is a diagram exemplifying a configuration of a base station of one exemplary embodiment of the present invention.

FIG. 4 is a diagram schematically illustrating a configuration example of the base station 2 of FIG. 1. Referring to FIG. 4, the base station 2 includes an RF transmission/reception unit 201, a signal processing unit 202, a terminal measurement value storage unit 203, a network transmission/reception unit 204, a control unit 205, and an antenna 206. The RF transmission/reception unit 201 supplies, to the signal processing unit 202, an analog baseband signal obtained by frequency conversion of an RF signal received from the antenna 206. Further, the RF transmission/reception unit 201 power-amplifies an RF signal obtained by frequency conversion of a transmission signal from the signal processing unit 202 and transmits the amplified signal from the antenna 206. The signal processing unit 202 executes signal processing for converting the analog baseband signal from the RF transmission/reception unit 201 to a digital signal, and stores measurement values from the mobile terminal 1 on the terminal measurement value storage unit 203. Further, the signal processing unit 202 outputs data addressed from the mobile terminal 1 to a network (including a network such as the Internet) to the network transmission/reception unit 204. The network transmission/reception unit 204 reads terminal measurement values stored on the terminal measurement value storage unit 203 and transmits the read values to, for example, the analysis client 5 via a network interface. The control unit 205 controls, for example, the respective units of 201 to 204 and also executes control for instructions for transmitting a measurement instruction signal to the mobile terminal 1, transmitting a measurement report to the mobile terminal 1, and the like, in addition to control for wireless connection establishment with the mobile terminal 1 and control for Hand Over (HO) of the mobile terminal 1.

Figure 5:
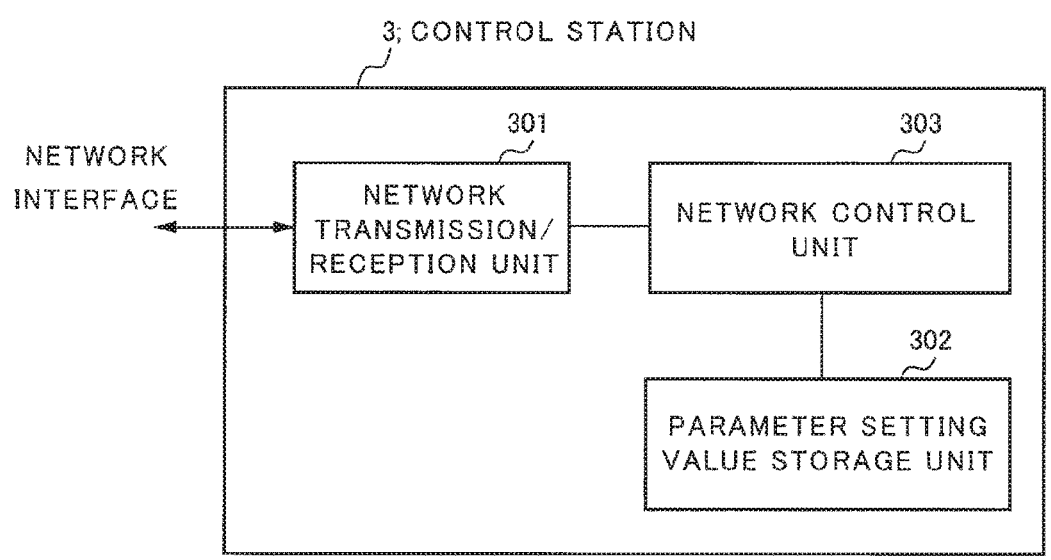
FIG. 5 is a diagram exemplifying a configuration of a control station of one exemplary embodiment of the present invention.

FIG. 5 is a diagram schematically illustrating a configuration example of the control station 3 of FIG. 1. Referring to FIG. 5, the control station 3 includes a network transmission/reception unit 301 connected to the base station 2, the analysis server 6, and the like via a network interface, a parameter setting value storage unit 302 that stores a parameter setting value analyzed by the analysis server 6, and a network control unit 303 that controls network operations. In the case of UTRAN, it is assumed that the base station 2 (NodeB) and the wireless control station (RNC) are separate devices but may be implemented on the same device. In this case, the parameter setting value storage unit 302 and the network control unit 303 of the control station 3 may be implemented on the base station 2.

Figure 6:
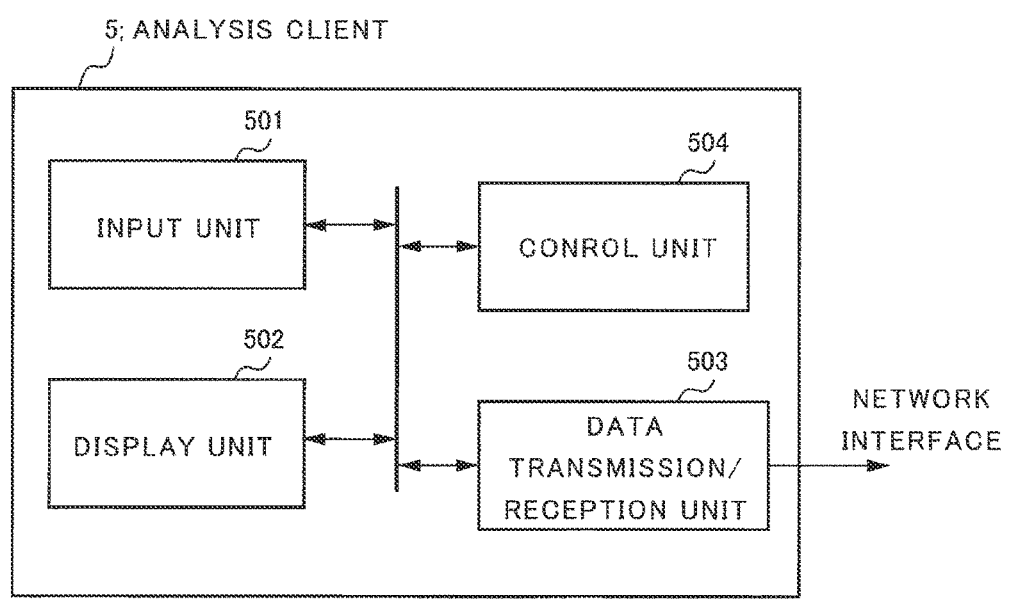
FIG. 6 is a diagram exemplifying a configuration of an analysis client of one exemplary embodiment of the present invention.

FIG. 6 is a diagram schematically illustrating a configuration example of the analysis client 5 of FIG. 1. Referring to FIG. 6, the analysis client 5 includes an input unit 501, a display unit 502, a data transmission/reception unit 503, and a control unit 504. The input unit 501 inputs an analysis condition. The display unit 502 displays a result analyzed in the analysis server 6. The data transmission/reception unit 503 preforms transmission/reception of data to/from the analysis server 6. The control unit 504 controls the respective units of the analysis client 5.

Figure 7:
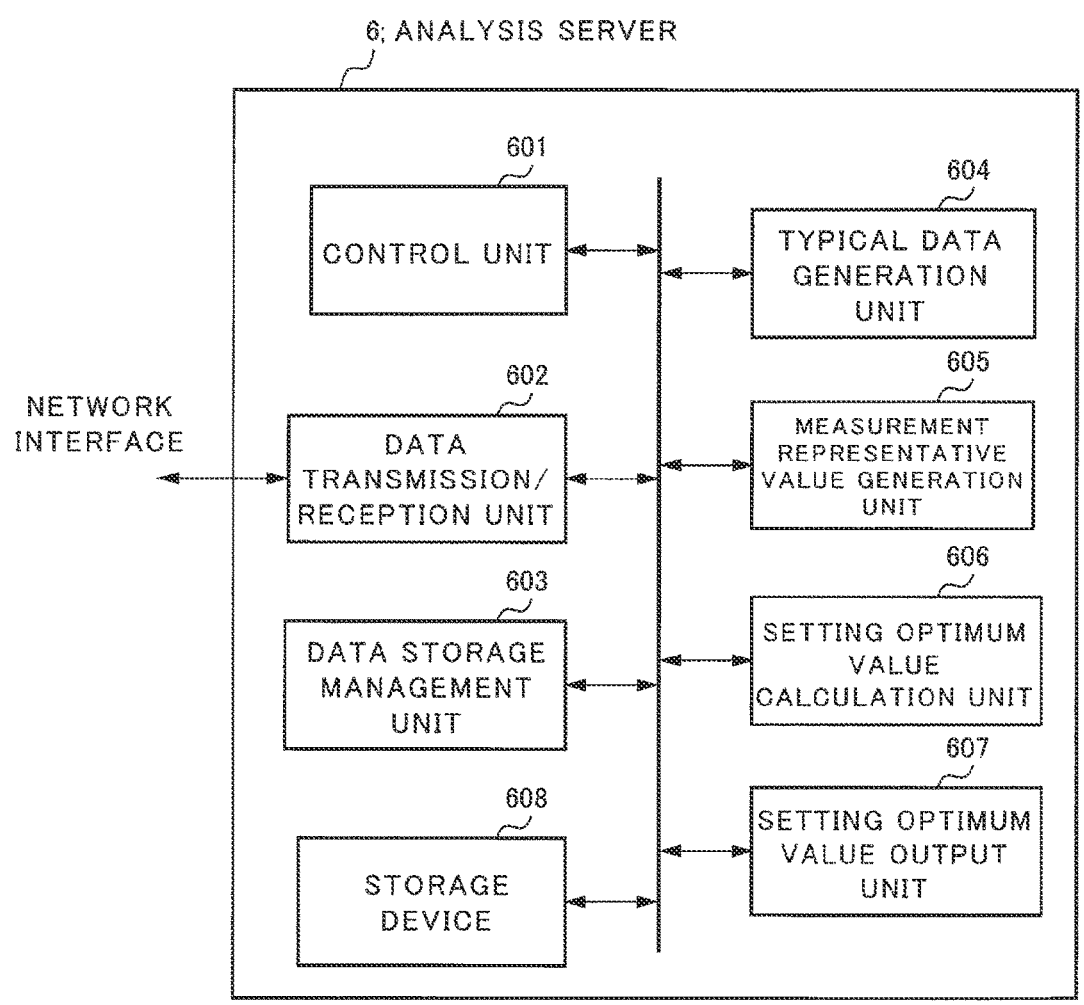
FIG. 7 is a diagram exemplifying a configuration of an analysis server of one exemplary embodiment of the present invention.

FIG. 7 is a diagram schematically illustrating a configuration example of the analysis server 6 of FIG. 1. Referring to FIG. 7, the analysis server 6 includes a control unit 601, a data transmission/reception unit 602, a data storage management unit 603, a typical data generation unit 604, a measurement representative value generation unit 605, a setting optimum value calculation unit 606, a setting optimum value output unit 607, and a storage device 608. At least a part or all of processings of the control unit 601, the data transmission/reception unit 602, the data storage management unit 603, the typical data generation unit 604, the measurement representative value generation unit 605, the setting optimum value calculation unit 606, and the setting optimum value output unit 607 in the analysis server 6 may be implemented by a program executed on a computer configuring the analysis server 6.

The data transmission/reception unit 602 preforms transmission/reception of data to/from the data transmission/reception unit 503 of the analysis client 5, and performs transmission/reception of data to/from the network transmission/reception unit 204 of the base band station 2.

The data storage management unit 603 executes processing for writing, on the storage device 608, and reading, from the storage device 608, measurement information in the mobile terminal 1 transferred, for example, from the base station 2, and typical data, a measurement representative value, and result information of a setting optimum value generated in the typical data generation unit 604, the measurement representative value generation unit 605, and the setting optimum value calculation unit 606. The storage device 608 may be disposed outside the analysis server 6. Although being not specifically limited, the data storage management unit 603 may be configured as a database management unit, and the storage device 608 may include a database.

The typical data generation unit 604 generates corresponding typical data for the measuring instrument 4 and terminal types of the mobile terminal 1, respectively. Further, the typical data generation unit 604 groups similar pieces of the typical data of the measuring instrument and the typical data of the mobile terminal for each terminal type into the same group. In the typical data generation unit 604, the measuring instrument 4 may be handled as another type of the mobile terminal 1, and alternatively, at least one of a plurality of mobile terminals 1 may be handled as the measuring instrument 4.

The measurement representative value generation unit 605 generates measurement representative values (distribution) for a certain measurement data set from the typical data generated in the typical data generation unit 604. The measurement representative value generation unit 605 synthesizes a distribution of the measurement representative values on the basis of a distribution of the typical data of the same group and a population distribution of the terminal types in the group. The measurement representative value generation unit 605 creates, for example, a population distribution of the terminal types and determines, when a domination rate of a group to which the measuring instrument belongs exceeds a predetermined specific value, a measurement value of the group to which measurement information of the measuring instrument belongs as the measurement representative value.

On the other hand, when a domination rate of a group to which the measuring instrument belongs is equal to or smaller than the predetermined specific value, it is possible that an average value and a standard deviation of the typical data of the terminal types for each group is determined, and a frequency distribution in accordance with a population distribution of the terminal types in the group is synthesized to thereby generate a distribution of the measurement representative values.

The setting optimum value calculation unit 606 calculates a setting optimum value for network optimization for the base station 2 and the control station 3.

The setting optimum value output unit 607 outputs the setting optimum value to the control station 3 or the base station 2 to be optimized.

Figure 8:
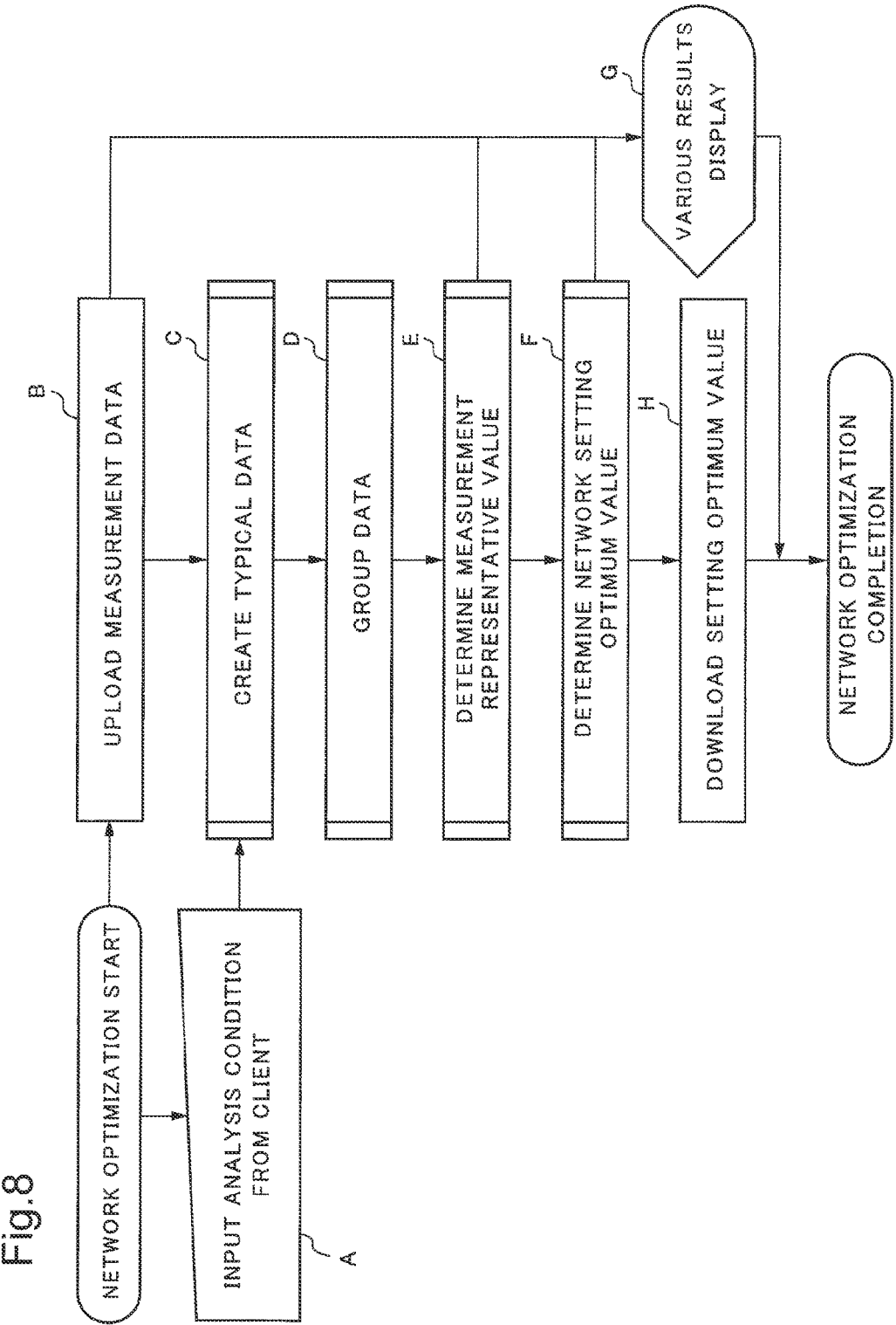
FIG. 8 is a flow diagram (flowchart) exemplifying processing steps of one exemplary embodiment of the present invention.

FIG. 8 is a flow diagram (flowchart) illustrating all processing steps of network optimization in the present exemplary embodiment. With reference to FIG. 8, the entire processing flow of the present exemplary embodiment will be described.

The analysis client 5 inputs information of an analysis condition (step A).

Terminal identification information and terminal measurement information are uploaded onto the analysis server 6 via the base station 2. Measurement information from the measuring instrument 4 is uploaded (step B). In the upload from the measuring instrument 4, it is possible that a removable storage medium storing measurement information is mounted in a storage medium read device of the analysis client 5, and the measurement information is read in the analysis client 5 and uploaded onto the analysis server 6. A set (aggregation) of pieces of measurement information to be analyzed of the uploaded pieces of measurement information is referred to as a "measurement set."

The typical data generation unit 604 of the analysis server 6 creates typical data for each device type on the basis of the uploaded information (step C).

The typical data generation unit 604 of the analysis server 6 confirms a correlation of the typical data between the terminal types and groups the typical data similar in a reception characteristic into a common group. The typical data generation unit 604 of the analysis server 6 allocates group identification information (group number) to this one group (step D).

The measurement representative value generation unit 605 of the analysis server 6 inputs population distribution information of terminals in a certain area (cell) (e.g. a population distribution in an area for each terminal type such as a mobile information terminal (e.g. an Android smartphone (Android is a trademark or a registered trademark of Google Inc.)) for the terminal 1d of FIG. 15, a mobile information terminal of another type (e.g. iPhone (a trademark of Apple Inc.) for 1e, and mobile phone terminals for 1a to 1c), synthesizes a distribution of typical data in accordance with a ratio of the population distribution, and generates a measurement representative value distribution in a measurement set (measurement data aggregation) (step E).

The setting optimum value calculation unit 606 of the analysis server 6 determines a setting optimum value of a network from the measurement representative values (step F).

The setting optimum value output unit 607 of the analysis server 6 downloads the determined setting optimum value onto the base station 2/the control station 3 (step H).

In the example of FIG. 8, processing results for processes from the upload (step B) of measurement data to the download (step H) of a setting optimum value onto the base station2/the control station 3 may be confirmed (step G) in the display unit 502 (see FIG. 6) of the analysis client 5.

Figure 9:
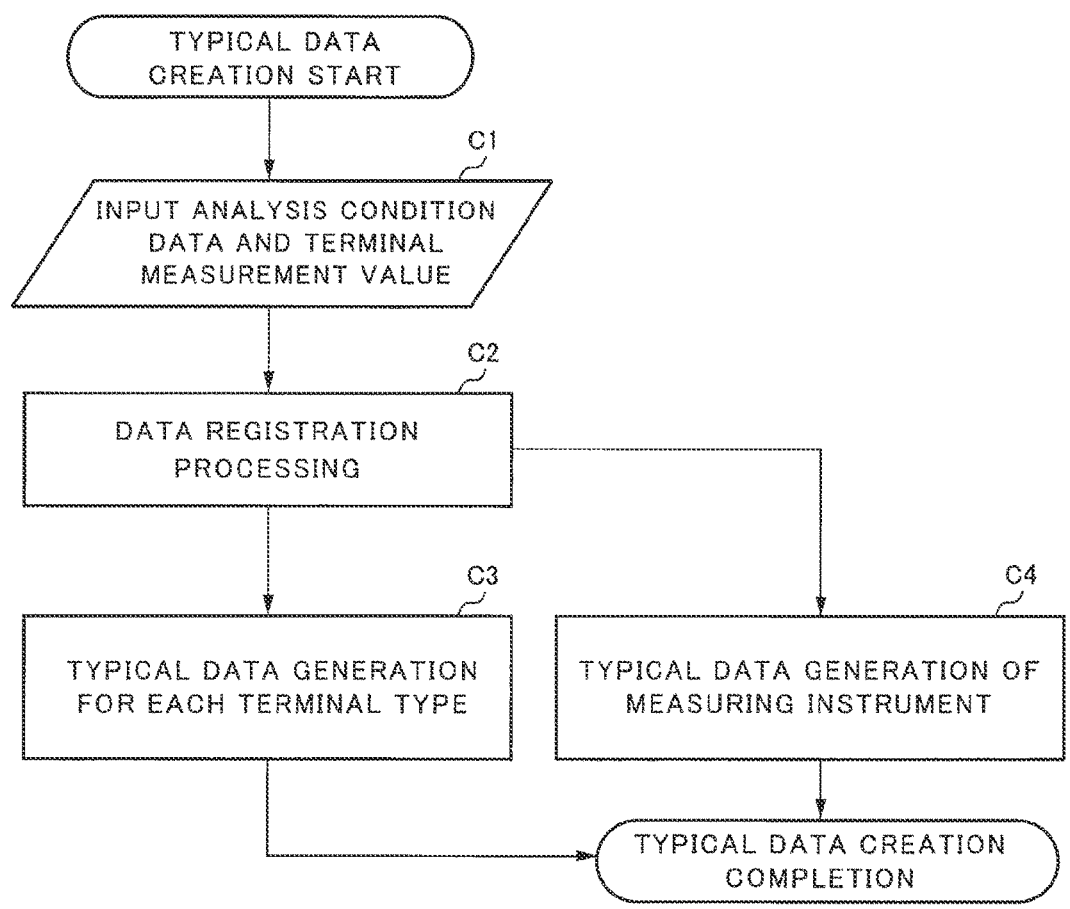
FIG. 9 is a flow diagram exemplifying typical data creation processing steps of one exemplary embodiment of the present invention.

FIG. 9 is a flowchart illustrating step of typical data generation processing (step C of FIG. 8) in the analysis server 6. With reference to FIG. 9, typical data generation processing using the typical data generation unit 604 and the like of the analysis server 6 illustrated in FIG. 7 will be described.

The data transmission/reception unit 602 of the analysis server 6 inputs an analysis condition, terminal identification information and terminal measurement data uploaded from the mobile terminal 1, and measurement data measured by the measuring instrument 4 (step C0.

The data storage management unit 603 executes registration processing of the input data onto the storage device 608 (step C2). At this time, the storage device 608 stores the data, for example, in a format (data structure) illustrated in FIGS. 16(A) to 16(C). Without specific limitation, it is assumed that there is one measuring instrument 4 and a number of terminal types of the mobile terminal 1 is J.

The data structure illustrated in FIG. 16 is assumed to be a data structure (array) including, correspondingly to values of columns (fields) of Time (time stamp information), GPSLon, and GPSLat for each (a kth time; k=1 to K) of measurements of a plurality of numbers of times measured by the measuring instrument 4, An MEQk_PCI (Physical Cell ID) of a cell where the measuring instrument 4 is located, An MEQk_distance from a serving base station of the measuring instrument 4, and Measurement data RSRP and an RSRQ (MEQk_RSRP and MEQk_RSRQ).

Further, assumed is a data structure (array) including, for each (a kth time; k=1 to K) of measurements of a plurality of numbers of times measured by a terminal type j (j=1 to J) of the mobile terminal 1, An MDTj_PCI of a cell where the mobile terminal 1 is located, An MDTj_distance from a serving base station, and Measurement data MDTj_RSRP and an MDTj_RSRQ).

In the data structure of FIG. 16, simply for convenience of drawing preparation, in chronological order, first six rows are listed. With respect to Time of FIG. 6, a measurement time (time stamp information) when a stand-alone type measuring instrument 4 acquires measurement information and network time stamp information are not synchronized. Without specific limitation, in the example of FIG. 16, upon storage onto the storage device 608 by the data storage management unit 603, an adjustment is performed for a measurement time (network time stamp information) in the mobile terminal 1 and is stored as chronological information corresponding to the measurement time in the mobile terminal 1.

In the analysis server 6, the typical data generation unit 604 reads data from the storage device 608 via the data storage management unit 603, picks up a code of a necessary digit number from terminal identification information (IMEI), and allocates a terminal type number (j=1, 2, ..., J), for example, as illustrated in FIG. 17.

It is assumed that a chronological sample number (a number of items for the time stamp (Time) of FIG. 16) for a measurement time is I. The typical data generation unit 604 generates typical data for measurement data of the measuring instrument 4 and the mobile terminal 1 for each terminal type j in accordance with the following (step C3).

The typical data generation unit 604 determines an average value $\mu_{MDT}(j,k)$ and a standard deviation $\sigma_{MDT}(j,k)$ of measurement data (a square of a standard deviation is a variance) MDT(i,j,k) of the mobile terminal 1 for an interval I of measurement values specified by the analysis client 5. The signs $\mu_{MDT}(j,k)$ and $\sigma_{MDT}(j,k)$ each are an average value and a standard deviation of I pieces of a kth time (k=1 to K) measurement data MDT(i,j,k) of a terminal type j (j=1 to J).

The measurement data MDT(i,j,k) represents, in FIG. 16, ith (an ith row (entry) of the data structure of FIG. 16) measurement data of chronological data, with respect to kth time (k=1 to K) measurement data MDTj-k_RSRP or MDTj-k_RSRQ (MDTj-k_RSRP upon use of RSRP as the measurement data and MDTj-k_RSRQ upon use of RSRQ) of a terminal type j (j=1 to J).

$$\mu_{MDT}(j,k) = \frac{1}{I}\sum_{i=1}^{I} MDT(i,j,k) \quad (1)$$

$$\sigma^2_{MDT}(j,k) = \frac{1}{I}\sum_{i=1}^{I} (MDT(i,j,k) - \mu_{MDT}(j,k))^2 \quad (2)$$

The typical data generation unit 604 creates $\mu_{MDT}(j,k)$ and $\sigma_{MDT}(j,k)$ for each of J types (j=1 to J) as a number of terminal types and measurements of K times (k=1 to K). The signs $\mu_{MDT}(j,k)$ and $\sigma_{MDT}(j,k)$ each are, in FIG. 16, an average value and a standard deviation of a chronological interval I (I pieces of measurement data of the same column direction of the data structure of FIG. 16) of measurement data MDTj-k_RSRP (or MDTj-k_RSRQ).

The typical data generation unit 604 extracts, for a set ($\sigma_{MDT}(j,1)$, $\sigma_{MDT}(j,1)$) to ($\mu_{MDT}(j,K)$, $\sigma_{MDT}(j,K)$)) of the average value and the standard deviation for measurement data of K times, L1 pieces of data falling within ranges previously set correspondingly to an average value and a standard deviation, respectively, for example, on the basis of k=1 as a reference (within a previously set range ($[\mu_{MDTLL}, \mu_{MDTUL}]$ of the following Equation (3)) of an lower limit and an upper limit of a average value and within a previously set range ($[\sigma_{MDTLL}, \sigma_{MDTUL}]$ of the following Equation (3)) of an lower limit and an upper limit of a standard deviation).

$$\mu_{MDTLL} \leq \mu_{MDT}(j,k) \leq \mu_{MDTUL}$$

$$\sigma_{MDTLL} \leq \sigma_{MDT}(j,k) \leq \sigma_{MDTUL} \quad (3)$$

At this time, L1 satisfies the flowing equation.

$$L1 \geq \frac{K}{2} \quad (4)$$

In the above Equation (3), instead of a standard deviation, a variance (a square of a standard deviation) may be used.

When L1 pieces of data satisfying the condition are extracted, L1 pieces of measurement data MDT(i,j,1) to MDT(i,j,L1) are obtained from k=1. When L1 pieces of data satisfying the condition are MDT(i,j,1), MDT(i,j,3), MDT(i,j,L1+n) (when columns where measurement data is disposed are not adjacent (continuous) in FIG. 16), indexes k of these pieces of measurement data MDT(i,j,k) may be re-numbered successively from 1 to obtain L1 pieces of measurement data MDT(i,j,1) to MDT(i,j,L1).

When a number of pieces beyond ranges set correspondingly to an average value and a standard deviation is K/2 or more, respectively, on the basis of k=1 as a reference, the same processing is repeated by changing the reference to k=2 (k+1 is substituted into k).

Regarding a terminal type j, an average value (given by following Equation (5)) of L1 pieces (K/2 or more pieces) of data extracted with respect to a measurement number of times of I for ith measurement data MDT(i,j,1) of I pieces of chronological data is determined as typical data typ$_{MDT}$(i,j) for data measured K times at a certain spot in a certain cell.

$$typ_{MDT}(i,j) = \frac{1}{L1}\sum_{l=1}^{L1} MDT(i,j,l) \quad (5)$$

In the typical data typ$_{MDT}$(i,j), L1 pieces of measurement data in which it is determined that regarding first to Kth time measurements of a terminal type j, a chronological average value for chronological measurement data (time interval I) at each measurement time falls within a predetermined specific range (above Equation (2)) and a dispersion (standard deviation or variance) thereof falls within a specific range (above Equation (3)) are extracted (numbers of times for chronological measurement data in which an average markedly deviates and chronological measurement data having large dispersion are excluded), and typical data for ith measurement data in chronological order (measurement data MDT (i,j,k); k=1 to L1 located in a row corresponding to the ith time in chronological order in the data structure) is determined as an average value of L1 pieces (L1 times) of measurement data extracted correspondingly to the ith measurement in chronological order.

The typical data generation unit 604 executes the same processing for measurement data of the measuring instrument 4 and determines typical data of the measuring instrument 4 (step C4). A number of measurement data sets extracted in the measuring instrument 4 is designated as L2. In the present exemplary embodiment, the measuring instrument is handled as one type, but when measurement data measured by a plurality of types of measuring instruments is analyzed, a plurality of pieces of typical data may be created correspondingly to a plurality of types of measuring instrument 4. However, when it is difficult to allow any one of a plurality of types of measuring instruments to be a representative instrument, the plurality of measuring instruments may be handled as all terminals (each different from another terminal in terminal type).

Further, when there is no measurement data measured by a measuring instrument, one optional terminal type may be used instead of the measuring instrument. In the following description, for simplifying description, it is assumed that there is one type for the measuring instrument 4.

For the interval I of measurement values specified by the analysis client 5, an average value $\mu_{MEQ}(k)$ and a standard deviation $\sigma_{MEQ}(k)$ of measurement data MEQ(i,k) of the measuring instrument 4 are determined. The $\mu_{MEQ}(k)$ and $\sigma_{MEQ}(k)$ are an average value of I pieces of kth time (k=1 to K) measurement data MEQ(i,k). The MEQ(i,k) represents ith (an ith upon arrangement of time stamps in chronological order) data of chronological data for kth time (k=1 to K) measurement data MEQk_RSRP and MEQk_RSRQ in FIG. 16.

$$\mu_{MEQ}(k) = \frac{1}{I}\sum_{i=1}^{I} MEQ(i,k) \quad (6)$$

$$\sigma^2_{MEQ}(k) = \frac{1}{I}\sum_{i=1}^{I} (MEQ(i,k) - \mu_{MEQ}(k))^2 \quad (7)$$

The typical data generation unit 604 extracts, for a set ($\mu_{MEQ}(1)$, $\sigma_{MEQ}(1)$) to ($\mu_{MEQ}(K)$, $\sigma_{MEQ}(K)$)) of the average value and the standard deviation for measurement data of K times, L2 pieces of data falling within ranges (ranges of a lower limit and an upper limit) (i.e. an average value falls within a range [$\mu_{MEQLL}$, $\mu_{MEQUL}$] of following Equation (8) and a standard deviation falls within a range [$\sigma_{MEQLL}$, $\sigma_{MEQUL}$] of following Equation (8)) set correspondingly to an average value and a standard deviation, respectively, on the basis of k=1 as a reference.

$$\mu_{MEQLL} \leq \mu_{MEQ}(k) \leq \mu_{MEQUL}$$

$$\sigma_{MEQLL} \leq \sigma_{MEQ}(k) \leq \sigma_{MEQUL} \quad (8)$$

At this time, L2 is the following.

$$L2 \geq \frac{K}{2} \quad (9)$$

When in the typical data generation unit 604, L2 pieces of data satisfying the above condition are extracted, MEQ(i,1) to MEQ(i,L2) that are L2 pieces of data based on k=1 are obtained. When L2 pieces of data satisfying the condition are MEQ(i,1), MEQ(i,3), MEQ(i,L2+n), an index k for measurement data MEQ(i,k) may be re-numbered successively from 1 to obtain MEQ(i,1), MEQ(i,2), . . . , MEQ(i, L2). When a number of pieces beyond ranges set correspondingly to an average value and a standard deviation, respectively, on the basis of k=1 as a reference, K/2 or more, the reference is changed to k=2 (k+1 is substituted into k) and the same processing is repeated.

The typical data generation unit 604 determines an average value (see following Equation (10)) of L2 pieces (K/2 or more pieces) of data extracted with respect to a measurement number of times of 1 for ith measurement data MEQ (i,1) of I pieces of chronological data as typical data $typ_{MEQ}$ (i) of the measuring instrument 4 for data measured K times at a certain spot in a certain cell.

$$typ_{MEQ}(i) = \frac{1}{L2} \sum_{l=1}^{L2} MEQ(i, l) \quad (10)$$

Figure 10:
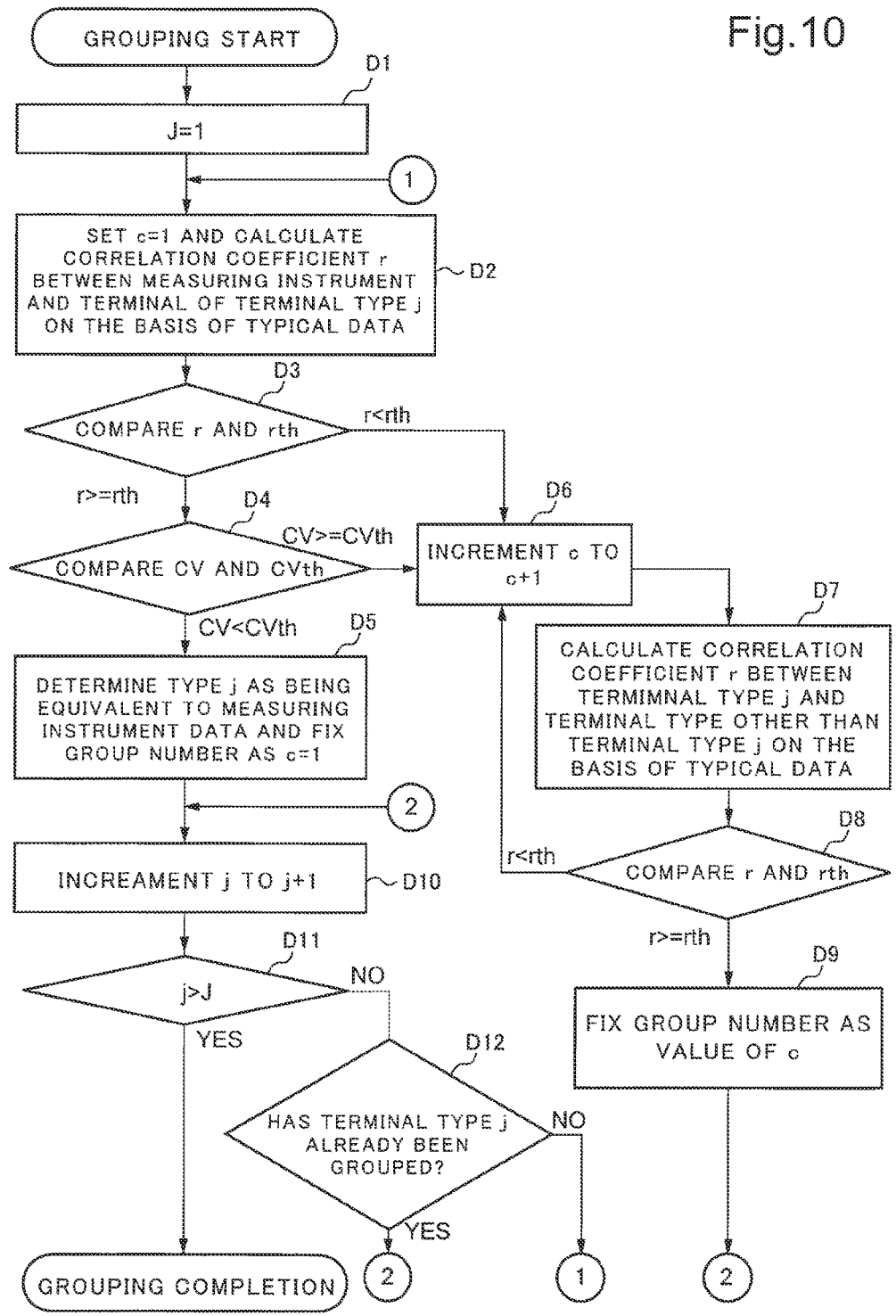
FIG. 10 is a flow diagram exemplifying processing steps of grouping of one exemplary embodiment of the present invention.

FIG. 10 is a flow diagram illustrating one example of grouping (details of step D of FIG. 8) on the basis of a correlation of typical data between a terminal type and a measuring instrument. With reference to FIG. 10, measurement information grouping based on typical data ($typ_{MDT}$ and $typ_{MEQ}$) of a terminal type and a measuring instrument will be described. Processing of FIG. 10 is executed, for example, in the typical data generation unit 604 of FIG. 7. In FIG. 10, simply for description, grouping processing is started from a terminal type j=1 (step D0, but it goes without saying that grouping processing may be started from any type of terminal types j=1 to J.

Figure 11:
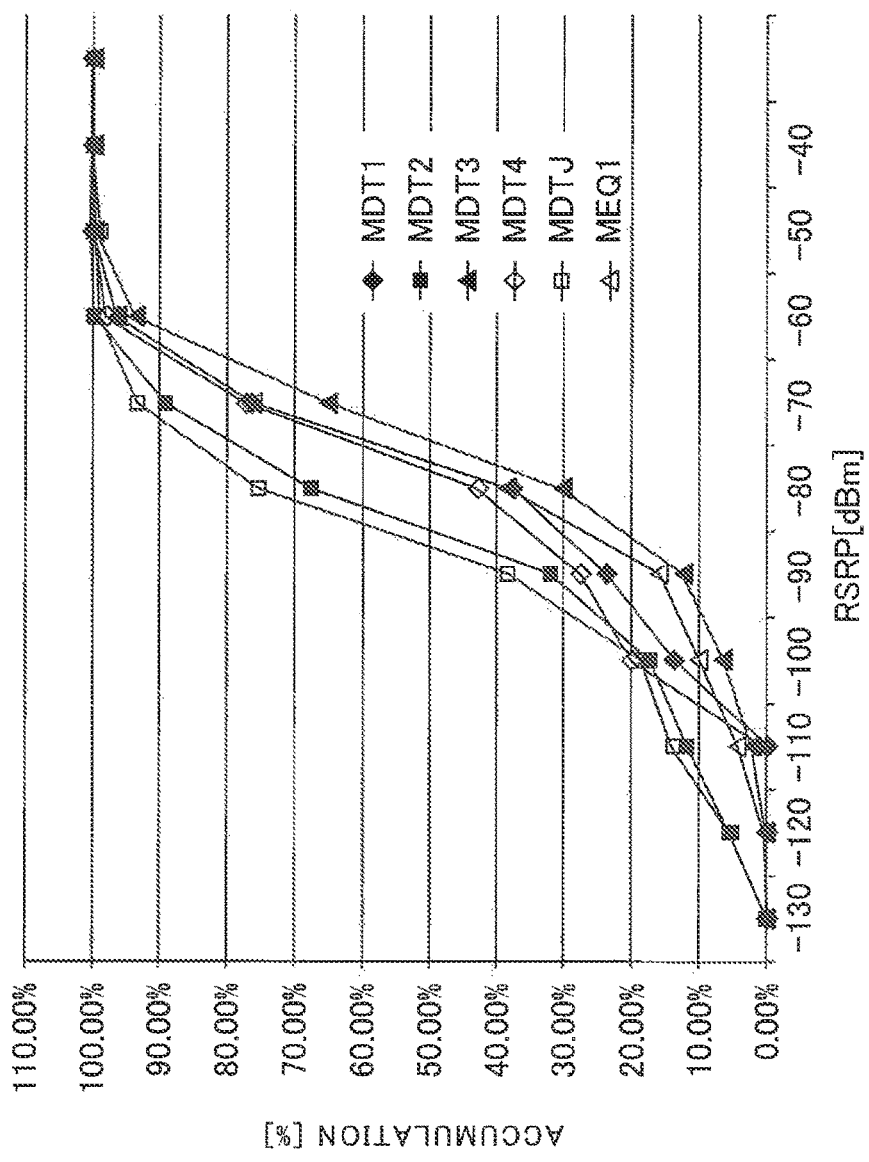
FIG. 11 is a diagram exemplifying an accumulated distribution example of a first example of the present invention.

The typical data generation unit 604 of the analysis server 6 creates frequency distributions (see, for example, FIG. 14) of typical data $typ_{MEQ}$(m) of the measuring instrument 4 and $typ_{MDT}$(m,j) of a terminal type j of the mobile terminal 1 on the basis of an interval handled by a threshold $r_{th}$ of a correlation coefficient set in the analysis client 5. An accumulated rate distribution (accumulated relative frequency distribution) is created for the measuring instrument 4 and each of terminal types j (j=1 to J) of the mobile terminal 1. It is assumed that a number of segments of an accumulated rate distribution is M. FIG. 11 illustrates one example of an accumulated rate distribution of typical data (MDT1 to MDTJ, and MEQ1) of a reference signal received power RSRP of a measuring instrument and mobile terminals of terminal types j=1 to J.

The typical data generation unit 604 sets a group number as c=1 and determines a correlation coefficient r between typical data $typ_{MEQ}$(m) of a measuring instrument and typical data $typ_{MDT}$(m,j) (m=1 to M) of a terminal type (step D2). As the correlation coefficient r, substantially the same result is obtained via calculation using any one of a frequency distribution and an accumulated rate distribution.

A total number of combinations for determining a correlation coefficient r of typical data (frequency distribution) between J terminal types and a measuring instrument is a number of combinations of selecting two from a total number J of the terminal types and one type of measuring instrument:

$$(J+1)!/\{(J-1)! \cdot 2!\} = J(J+1)/2 \quad (11)$$

(! represents a factorial). One example of correlation coefficients r between a terminal type j (j=1 to J) and other terminal types and the measuring instrument 4 (MEQ1) is exemplified in FIG. 18.

A correlation coefficient r ($typ_{MEQ}$(M), $type_{MDT}$(m,j)) between mth typical data in chronological order according to a measuring instrument and mth typical data in chronological order of a terminal type j is given as the following Equation (12):

$$r(typ_{MDT}(m, j), typ_{MEQ}(m)) = \quad (12)$$

$$\frac{\sum_{m=1}^{M}(typ_{MDT}(m, j) - \mu_{typMDT}(j))(typ_{MEQ}(m) - \mu_{typMEQ})}{\sqrt{\sum_{m=1}^{M}(typ_{MDT}(m, j) - \mu_{typMDT}(j))^2} \sqrt{\sum_{m=1}^{M}(typ_{MEQ}(m) - \mu_{typMEQ})^2}}$$

where $\mu_{typMEQ}$ and $\sigma_{typMDT}$(j) are, as indicated in the following Equations (13) and (14), average values of mth (m=1 to M) typical data $typ_{MEQ}$(m) of a measuring instrument in chronological order and mth typical data $typ_{MDT}$ (m,j) of a terminal type j in chronological order, respectively.

$$\mu_{typeMEQ} = \frac{1}{M} \sum_{m=1}^{M} typ_{MEQ}(m) \quad (13)$$

$$\mu_{typeMDT}(j) = \frac{1}{M} \sum_{m=1}^{M} typ_{MDT}(m, j) \quad (14)$$

The correlation coefficient r ($typ_{MEQ}$(m), $type_{MDT}$(m,j)) and a threshold rth of a correlation value set in the analysis client 5 are compared (step D3).

When the correlation coefficient r ($typ_{MEQ}$(m), $type_{MDT}$ (m,j) is larger than the threshold rth (a branch of r≥rth of step D3), a measurement result of the mobile terminal 1 of the terminal type j may be equivalent to a measurement result of the measuring instrument 4.

Therefore, handling as the same group as the measuring instrument 4 is performed. However, there is a case in which a difference in average value between pieces of measurement data (typical data) of the measuring instrument 4 and the mobile terminal 1 is large or a possibility that variances of values are biased due to a size of a number of samples (population scale). Accordingly, a variation coefficient (a value CV obtained by dividing a standard deviation σ by an average value μ) is calculated and the variation coefficient is compared with a threshold CVth set in the analysis client 5 (step D4), and when the variation coefficient CV is smaller than the threshold CVth, handling as the same group (group number) as the measuring instrument 4 is performed (step D5). Without specific limitation, in the example of FIG. 10, a group number c=1 is assumed to be the same number as for the measuring instrument 4. When as a result of the comparison determination of step D3, the correlation coefficient r (typ$_{MEQ}$(m), type$_{MDT}$(m,j) is equal to or larger than the threshold rth and as a result of the comparison determination of step D4, the variation coefficient CV is smaller than the threshold CVth, in step D5, a group number c=1 is allocated to a terminal of the terminal type j (a current value is 1).

When as the result of the comparison determination of step D4, the variation coefficient CV is equal to or larger than the threshold CVth, in step D6, c is allocated as c+1 (c=2 is allocated in this case). Further, when as the result of the comparison determination of step D3, the correlation coefficient r is smaller than the threshold rth (a branch of r<rth of step D3), in step D6, c is allocated as c+1 (c becomes 2).

In step D7, a correlation coefficient r between the typical data of the terminal type j and typical data of a terminal type other than the terminal type j is calculated.

In step D8, the correlation coefficient r is compared with the threshold rth, and when the correlation coefficient r is equal to or larger than the threshold rth, the group number is fixed as the current number c (step D9).

On the other hand, as a result of the comparison of step D8, when the correlation coefficient r is smaller than the threshold rth, the processing returns to step D6 and the group number c is allocated as c+1 (c becomes 3 in this case). Again, in step D7, a correlation coefficient with respect to another terminal type is calculated and compared with the threshold rth (step D8), and when the correlation coefficient r is equal to or larger than rth, processing for setting a group umber of the terminal type j as a group number c (=4) incremented in step D5 is repeated.

When in step D8, a correlation coefficient r between typical data of the terminal type j and typical data of a terminal type other than the terminal type j is equal to or larger than the threshold rth and in step D9, a group number of the terminal type j is fixed, the processing moves to step D10 and the terminal type j is incremented to j+1. When the incremented terminal type j exceeds J (the YES branch of step D11), processing for grouping all of the terminal types is terminated.

When a new terminal type j incremented in step D10 is equal to or smaller than J (the NO branch of step D11), whether the terminal type j has already been grouped (step D12) is checked. The fact that the terminal type j has already been grouped means that in step D9, a group number has been fixed.

When the new terminal type j has already been grouped (the YES branch of step D12), the processing moves to step D10. When the new terminal type j has not been grouped (the NO branch of step D12), the processing moves to step D2 and a group number to which the new terminal type j belongs is determined. In other words, a series of processing of steps D2 to D9 such as checking whether belonging to the same group as the measuring instrument 4 of the group number c=1 is established is executed. When, for example, a group number of the terminal 1 is determined, in step D8, a correlation coefficient r between a terminal type j=1 and a terminal type j=2 is equal to or larger than rth, and it is therefore determined that the terminal types belong to the same group (in FIG. 18, when the correlation coefficient r is 0.885 and the threshold is set to be 0.88, it is determined as being correlated (similar)). When in step D9, a group number c=2 is allocated, with respect to processing for the terminal type j=2 executed following the terminal type j=1, in determination processing of step D12, a group number of the terminal type 2 has been determined as c=2 by grouping. Therefore, the determination processing for the group number of the terminal type 2 is omitted (skipped), and processing for determining a group number to which a terminal type 3 belongs in step D10 is executed from step D2.

Figure 12:
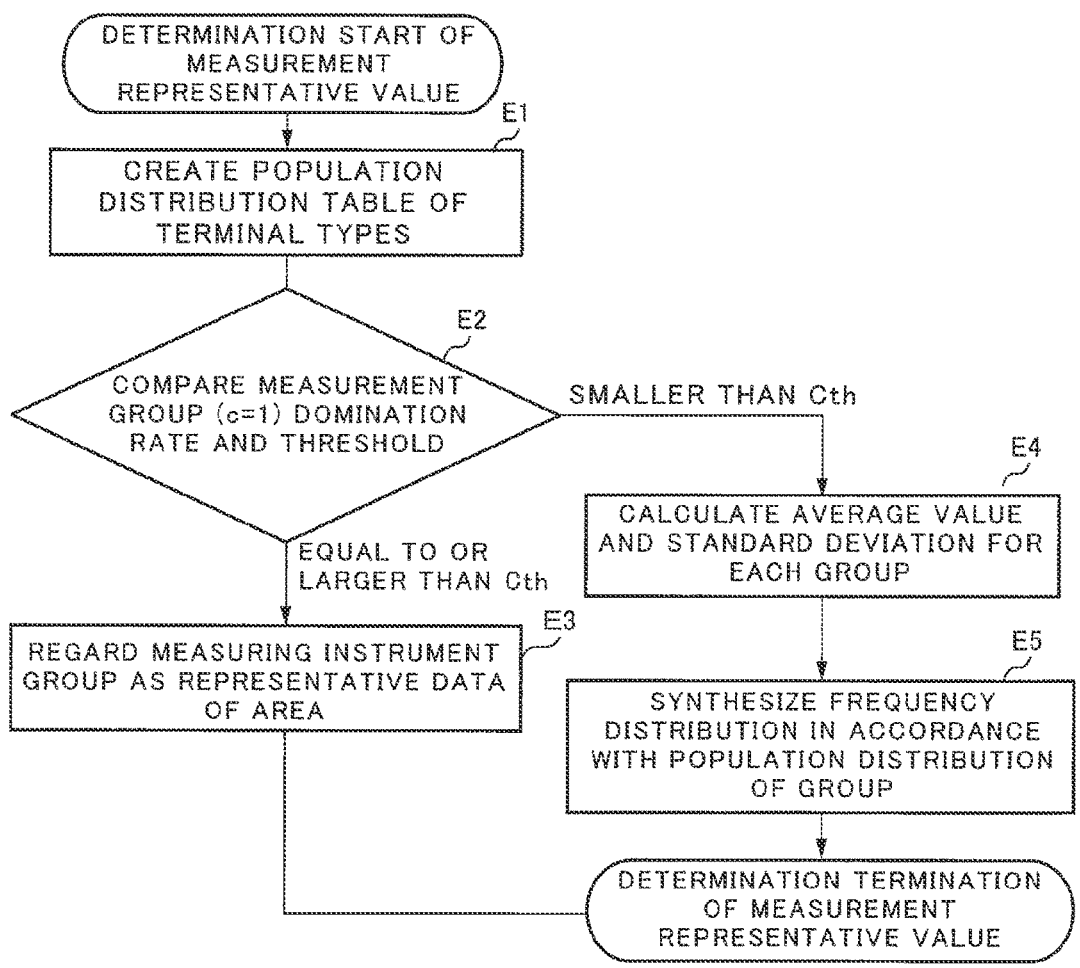
FIG. 12 is a flow diagram exemplifying processing steps of data set measurement representative value determination of one exemplary embodiment of the present invention.

Next, generation processing of a measurement representative value distribution by the measurement representative value generation unit 605 of the analysis server 6 (FIG. 7) will be described. FIG. 12 is a flow diagram (flowchart) illustrating determination steps of a measurement representative value by the measurement representative value generation unit 605 of the analysis server 6. The analysis client 5 inputs population distribution information of terminal types. FIG. 19 illustrates one example of a population distribution for each PCI (Physical Cell Identifier) (base station sector: the base station sector is an area where a cell is divided into several parts). FIG. 19 illustrates a population distribution of terminal types j=1 to J classified into group numbers c=1 and 2 in the typical data generation unit 604.

The measurement representative value generation unit 605 of the analysis server 6 acquires, as a population ratio, a distribution for each type of mobile terminals in a time zone from terminal information of mobile terminals managed by the base station 2 or the control station 3 connected to the mobile terminals in a cell or terminal information of a mobile terminal such as an MME (Mobility Management Entity) managing mobility of mobile terminals or the like managed by a communication carrier.

The measurement representative value generation unit 605 of the analysis server 6 determines a ratio (population ratio) of terminal types j (j=1 to J) for each group from a correspondence relation between a group number c and terminal types (step E1).

The measurement representative value generation unit 605 of the analysis server 6 compares a population ratio (domination rate) of a group (a group number c=1) to which the measuring instrument 4 belongs and a threshold Cth (step E2). The threshold Cth is input by, for example, an analysis condition input in the analysis client 5.

When the domination rate of the group (the group number c=1) to which the measuring instrument 4 belongs exceeds the threshold Cth, the measurement representative value generation unit 605 of the analysis server 6 determines the group of the measuring instrument 4 as a representative value (representative data) of an area (a unit section located at a distance specified by a radius from a base station in a cell) (step E3). The measurement representative value generation unit 605 determines a representative value of a measurement data set as a median of a frequency distribution of typical data of terminal types of the mobile terminal 1 included in the group to which the measuring instrument 4 belongs and a frequency distribution of typical data of the measuring instrument 4.

When the domination rate of the group to which the measuring instrument 4 belongs is equal to or smaller than the threshold Cth, the measurement representative value generation unit 605 of the analysis server 6 determines an average value and a standard deviation of the typical data of the terminal types for each group (step E4). When, for example, a terminal type j=1 and a terminal type j=2 of the mobile terminal 1 are grouped in a group number c=2, an average value and a standard deviation of typical data of these terminal types j=1 and 2 are determined.

The measurement representative value generation unit 605 of the analysis server 6 synthesizes a distribution of measurement representative values in accordance with typical data of terminal types in the same group and a population ratio (see, for example, FIG. 19) of the terminal types (step E3).

One specific example for step E5 is described below. When in the same group, there are, for example, Q (Q≤J) terminal types and population distributions are $w_1:w_2: \ldots w_Q$ ($w_1+w_2+ \ldots +w_Q=1$), for example, as represented in following Equation (15), a value obtained by weightedly averaging an average value $\mu_{typMDT}(i)$ of typical data of terminal types i (i=1 to Q) by $w_i$ (i=1 to Q) (a value obtained by dividing a weightedly added value by Q) is determined as a new average value $\mu_{rep}$. Further, as represented in following Equation (16), a value obtained by dividing, by Q, a value obtained by weightedly adding a square of a standard deviation $\sigma_{typMDT}(i)$ using a square of wi (i=1 to Q) on the basis of additivity of a variance is determined as a square (variance) of a new standard deviation $\sigma_{rep}$.

$$\mu_{rep} = \frac{1}{Q}\sum_{i=1}^{Q}(w_i \times \mu_{typMDT}(i)) \quad (15)$$

$$\sigma_{rep}^2 = \frac{1}{Q}\sum_{i=1}^{Q}(w_i^2 \times \sigma_{typMDT}^2(i)) \quad (16)$$

The measurement representative value generation unit 605 of the analysis server 6 generates (synthesizes) frequency distributions (normal distributions N ($\mu_{rep}, \sigma^2_{rep}$)) of the average value $\mu_{rep}$ and the variance (a square of $\sigma_{rep}$) using, for example, normal random numbers or the like and determines a measurement representative value distribution. The frequency distribution is determined for, for example, a section M (for example, a section of measurement values of a reference signal received power RSRP is designated as M). When the synthesized frequency distribution is a normal distribution, a median is the average value $\mu_{rep}$ as a measurement representative value.

A distribution obtained on the basis of the result (step E3) in which the domination rate of the group (a group number c=1) to which the measuring instrument 4 belongs is equal to or larger than the threshold Cth and the result (step E4) in which the domination rate of the group (a group number c=1) to which the measuring instrument 4 belongs is smaller than the threshold Cth is formed as one normal distribution.

Figure 13:
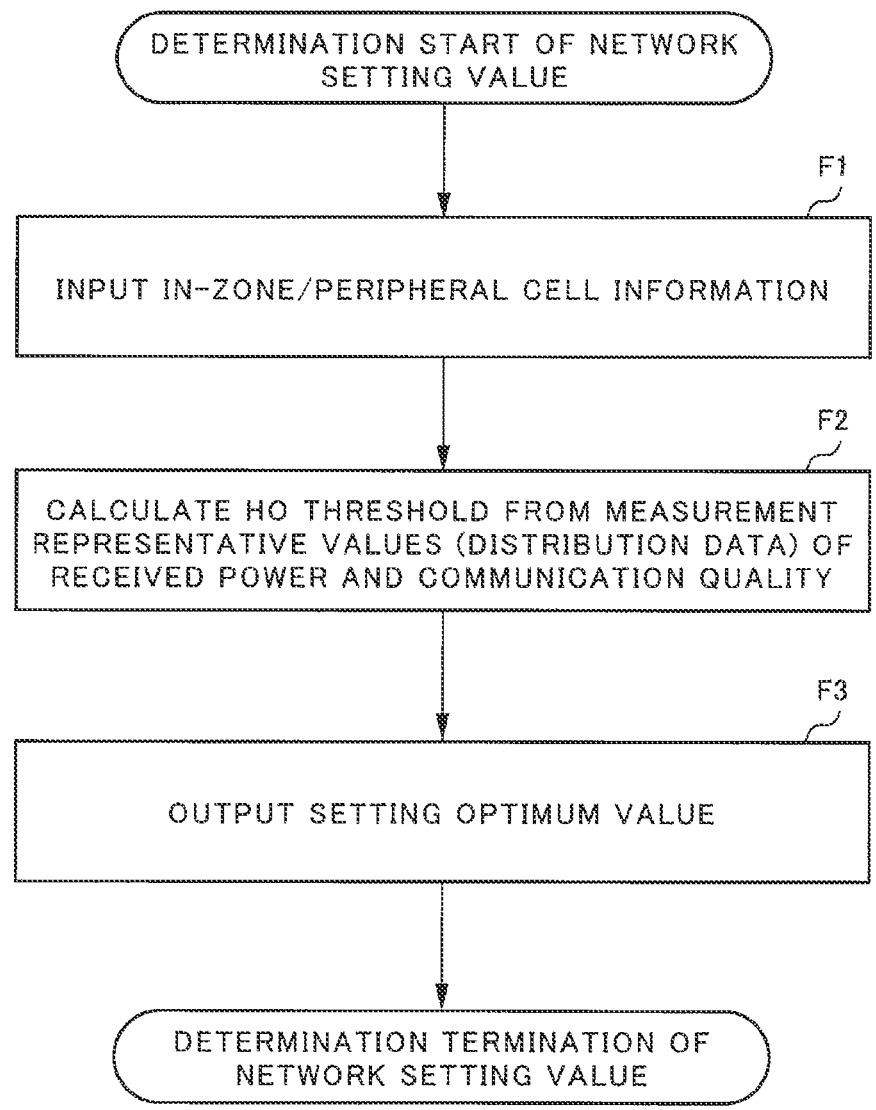
FIG. 13 is a flow diagram exemplifying processing steps of setting value calculation of one exemplary embodiment of the present invention.

The setting optimum value calculation unit 606 of the analysis server 6 calculates a setting value of a parameter for optimizing a network from a measurement representative value set obtained in each area in a cell. FIG. 13 is a flowchart for illustrating an example in which as processing of the setting optimum value calculation unit 606, a setting optimum value of a parameter for hand over is derived.

The setting optimum value calculation unit 606 of the analysis server 6 acquires, on the basis of peripheral cell information and in-zone cell information input to the analysis client 5 (step F1), measurement representative value distributions (received power RSRP and received quality RSRQ) generated in the measurement representative value generation unit 605 with respect to measurement data sets for the base station #1 (FIG. 1) and the base station #2 (FIG. 1) adjacent to the base station #1 in which information of a particular time zone and a particular latitude/longitude range is extracted.

The setting optimum value calculation unit 606 of the analysis server 6 calculates a hand over threshold value on the basis of the measurement representative value distributions of the received power RSRP and the received quality RSRQ (step F2).

The setting optimum value output unit 607 of the analysis server 6 outputs a setting optimum value calculated in the setting optimum value calculation unit 606 to the base station 2 or the control station 3 via the data transmission/reception unit 602 (step F3). The control station 3 stores the setting optimum value on the parameter setting value storage unit 302 to control the base station 2.

The setting optimum value calculation unit 606 of the analysis server 6 finds, in step F2, a point where a sign of a difference between the base station #1 and the base station #2 is reversed from the obtained measurement representative values (distribution data) and calculates a threshold. In the hand over, an event threshold (a threshold of a received power that functions as an even trigger of hand over (there are, for example, events A1, A2, and A5 in intra-LTE hand over)), a hysteresis (a hysteresis of a reception level or a hysteresis of a time direction such as TTT (Time To Trigger)), and the like are set in the base station or the control station 3.

Figure 14:
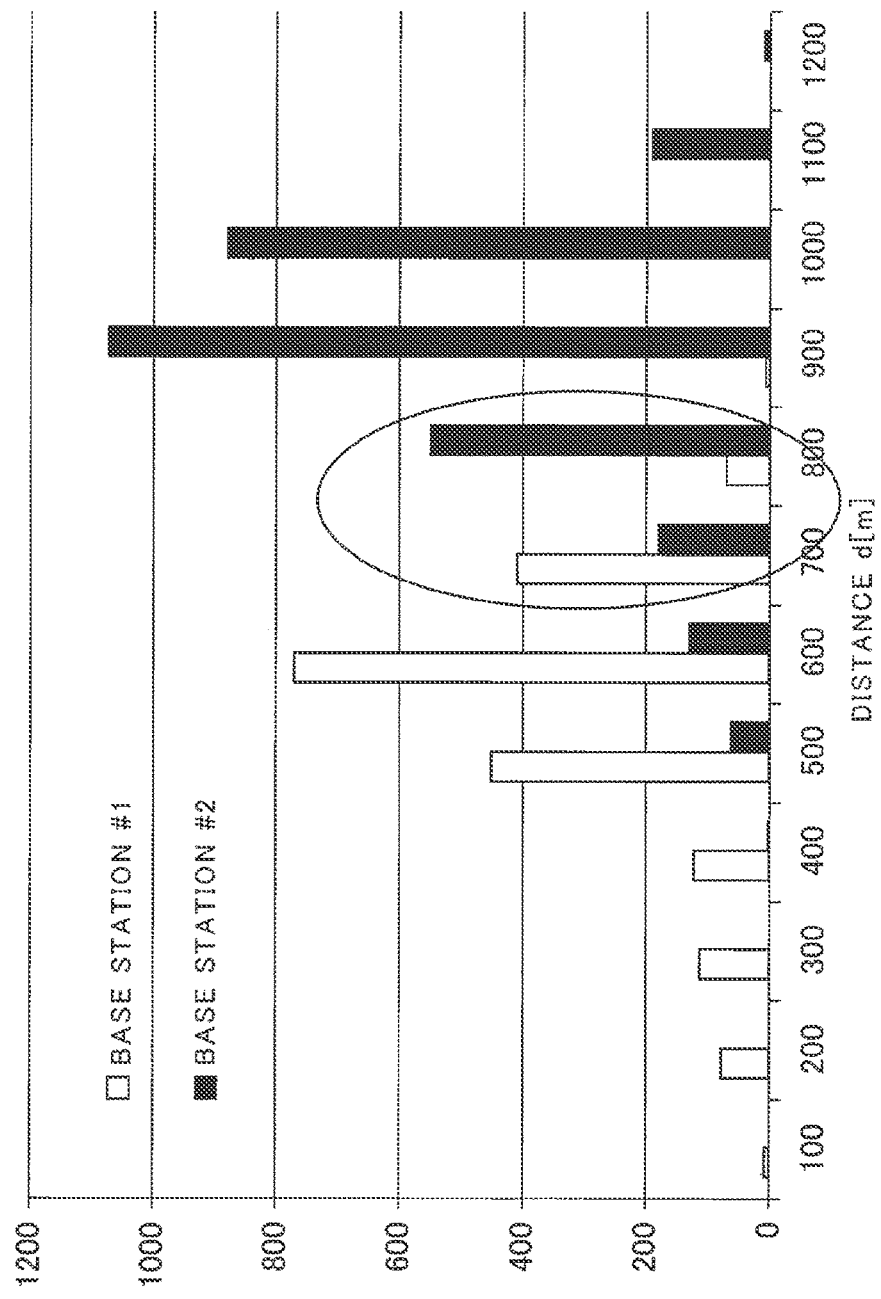
FIG. 14 is a diagram exemplifying a setting value calculation example of one exemplary embodiment of the present invention.

Referring to, for example, FIG. 14 as one example of setting optimum value calculation in the setting optimum value calculation unit 606, from a situation of a frequency (user number) at a certain distance (position), an optimum value is calculated to perform hand over from the base station #2 to the base station #1 at a spot of d=750 m.

In the spot of d=750 m of FIG. 14, it is assumed that an RSRP of the base station #2 is −90 [dBm]. In this case, an Event threshold is calculated as RSRP: −090 [dBm]. Further, 6 [dBm] in accordance with ensuring of a level difference of equal to or larger than ½ of a section 10 [dB] is determined as a hysteresis threshold (step F2 of FIG. 13). The setting optimum value output unit 607 outputs the calculated setting optimum value to the base station 2 or the control station 3 (step F3 of FIG. 13).

According to the present exemplary embodiment, when a parameter of a network is set on the basis of typical data of terminals, network optimization based on user experience quality can be performed.

Further, according to the present exemplary embodiment, when a grouped value is handled, in a location where a characteristic similar to that of a measuring instrument is obtained, data of the measuring instrument having high reliability can be utilized, and a characteristic of a terminal that behaves differently from the measuring instrument can be subjected to network analysis and optimization by generating typical data and using data that ensures reliability.

FIG. 20 schematically illustrates one example of an analysis condition input screen (page) of the analysis client 5.

FIGS. 20(A) and 20(B) each schematically illustrate one example of a screen (page) in which a login is performed into a network analysis program provided by the analysis server 6 from the analysis client 5 and measurement LOG data of a measuring instrument and a terminal are specified, and one example of a screen (page) in which analysis conditions such as various types of thresholds (rth, CVth, and Cth) and the like are input. In FIG. 20(A), specifying measurement LOG data of a measuring instrument and a terminal may include specifying a function for uploading data from the analysis client 5 onto the analysis server 6 and a function for deleting uploaded data (a text file or a binary file such as csv (Comma Separated Values)). For various types of thresholds (rth, CVth, and Cth), previously set default values may be used, respectively. Alternatively, it is possible to store current setting values for various types of thresholds (rth, CVth, and Cth) and set change amounts (relative amounts) for these values.

In the exemplary embodiment, with respect to creation (steps C3 and C4 of FIG. 9) of typical data, when measurement data forms a normal distribution, typical data of terminal types may be created using an F-test other than a method based on thresholds of an average value and a standard deviation. In this case, a threshold of a significance probability is set and an F-test value is used instead of an average value and a standard deviation. An F-test value in a significance probability set with a threshold and an F-test value obtained on the basis of measurement data are compared, and when the latter is larger, the measurement data is regarded to be employable for generating typical data.

Further, the exemplary embodiments described above may be implemented using software. Flowcharts of programs for controlling the analysis client 5, the analysis server 6, and the like are the same as those in FIG. 8 to FIG. 10, FIG. 12, and FIG. 13. In other words, processing executed by the analysis client 5, and analysis server 6, and the like may be implemented by executing programs by processors included in the analysis client 5, and analysis server 6, and the like. The programs may be stored on a semiconductor storage device such as a ROM (Read Only Memory), a RAM (Random Access Memory), a flash memory, and the like or a computer-readable, non-transitory recording medium such as an optical disk, a magnetic disk, and a magneto-optical disk.

In the exemplary embodiment, an example in which an analysis system is provided separately from a base station has been described, but it goes without saying that a function of the analysis server 6 may be implemented on the base station 2 or the control station 3 of FIG. 1. Functions of the analysis client 5 and the analysis server 6 may be integrally implemented on the base station 2 or the control station 3. As another manner, a function of an analysis system 6 may be implemented on a network facility, a server, or the like connected to a core network, or may be implemented on a virtual machine using a server virtualization technique or the like.

It should be noted that the disclosures of the patent literatures and the non-patent literatures are incorporated by reference in DESCRIPTION. Changes/adjustments of the exemplary embodiments and the examples can be made without departing from the scope of the entire disclosure (including Claims) of the present invention and further on the basis of its fundamental technical ideas. Further, various combinations and selections can be made for various types of disclosed components (including the components of each claim, the components of each example, the components of each drawing) without departing from the scope of Claims of the present invention. In other words, it goes without saying that the present invention includes various variations and modifications that could be made by those skilled in the art on the basis of the entire disclosure including Claims and its technical ideas.

This application is based upon and claims the benefit of priority from Japanese patent application No. 2014-045676, filed on Mar. 7, 2014, the disclosure of which is incorporated herein in its entirety by reference.

REFERENCE SIGNS LIST

1, 1a-1e Mobile terminal
2 Base station
3 Control station
4 Measuring instrument
5 Analysis client
6 Analysis server
7 Network
101 RF transmission/reception unit
102 Measurement unit
103 Measurement storage unit
104 Measurement value reporting unit
105 Terminal identification information reporting unit
106 Position information acquisition unit
107 Terminal control unit
108 Antenna
201 RF transmission/reception unit
202 Signal processing unit
203 Terminal measurement value storage unit
204 Network transmission/reception unit
205 Control unit
206 Antenna
301 Network transmission/reception unit
302 Parameter setting storage unit
303 Network control unit
401 RF reception unit
402 Measurement unit
403 Measurement storage unit
404 Data output unit
405 Antenna
501 Input unit
502 Display unit
503 Data transmission/reception unit
504 Control unit
601 Control unit
602 Data transmission/reception unit
603 Data storage management unit
604 Typical data generation unit
605 Measurement representative value generation unit
606 Setting optimum value calculation unit
607 Setting optimum value output unit
608 Storage device

The invention claimed is:

1. A method for processing measurement information for optimizing a mobile communication network, the method comprising:

acquiring using one or more processors measurement information of a reception signal state measured by a measuring instrument; acquiring, using the one or more processors, together with terminal type information, measurement information of a reception signal state measured by mobile terminals;

statistically processing using the one or more processors the measurement information of the measuring instrument and the measurement information of the mobile terminals for each terminal type; generating respective typical data;

grouping using the one or more processors similar pieces of the typical data of the measuring instrument and the typical data of the mobile terminals for each terminal type into the same group; and generating using the one or more processors a distribution of measurement representative values on the basis of a distribution of the typical data included in the same group and a distribution of the terminal types in the group setting a parameter of a network device on the basis of the distribution of measurement representative values.

2. The method for processing measurement information according to claim 1, the method further comprising:

creating a population distribution of the terminal types; and synthesizing a distribution of the measurement representative values on the basis of an average value and a standard deviation of the typical data included in the same group and a population distribution of the terminal types in the group.

3. The method for processing measurement information according to claim 1, the method further comprising:

storing a data structure including at least measurement information associated with a number of times of measurements per row and a plurality of the rows in chronological order on a storage device by being associated with the measuring instrument and the terminal types of the mobile terminals;

determining, for measurement information of a plurality of numbers of times stored in a certain row, an average value of a specific number of pieces of measurement information satisfying a condition in which a statistical characteristic in a predetermined chronological interval is previously determined;

executing processing for determining the average value as the typical data in association with the measuring instrument and the terminal types of the mobile terminals; and generating typical data of the measuring instrument and typical data of the mobile terminals for each terminal type.

4. The method for processing measurement information according to claim 3, wherein the data structure includes measurement points and components of measurement information by being associated with a number of times of measurements per row, and the measurement point is identified by a sector obtained by dividing a cell controlled by a base station or a distance from the base station.

5. The method for processing measurement information according to claim 3, the method further comprising:

upon creating the typical data, calculating an average value and a standard deviation of a specific number of pieces of measurement information stored in the same column in the data structure;

for each row of the data structure, extracting a predetermined specific number of columns in which the average and the standard deviation determined for measurement information in the same column direction fall within predetermined specific ranges, respectively, from measurement information of a plurality of numbers of times stored in the row;

executing processing for determining an average value of measurement information of the extracted specific number of columns as typical data corresponding to the row by being associated with the measuring instrument and the terminal types of the mobile terminals;

generating typical data of the measuring instrument and typical data of the mobile terminals for each terminal type;

calculating a correlation coefficient of the typical data between the measuring instrument and the terminal types of the mobile terminals; and grouping, when the correlation coefficient is equal to or larger than a predetermined threshold, the typical data into one group.

6. The method for processing measurement information according to claim 1, the method further comprising:

determining, when a domination rate of a group to which the measuring instrument belongs exceeds a predetermined specific value, a measurement value of the group to which measurement information of the measuring instrument belongs as the measurement representative value;

determining, when a domination rate of a group to which the measuring instrument belongs is equal to or smaller than the predetermined specific value, an average value and a standard deviation of the typical data of the terminal types for each group;

synthesizing a frequency distribution in accordance with a population distribution of the terminal types in the group; and generating a distribution of the measurement representative values.

7. The method for processing measurement information according to claim 1, the method further comprising:

handling at least one mobile terminal of a plurality of the mobile terminals as the measuring instrument; and determining measurement information of a reception signal state measured by the at least one mobile terminal as measurement information of the measuring instrument.

8. The method for processing measurement information according to claim 1, the method further comprising:

handling the measuring instrument as a mobile terminal further different in terminal type; and determining measurement information of a reception signal state measured by the measuring instrument as measurement informant of the mobile terminal further different in terminal type.

9. The method for processing measurement information according to claim 1, the method further comprising:

handling the mobile terminal grouped into the same group as the measuring instrument as the measuring instrument; and using typical data of the measuring instrument as typical data of the mobile terminal.

10. The method for processing measurement information according to claim 1, the method further comprising:

calculating, upon the grouping, a correlation coefficient of the typical data between the measuring instrument and the terminal types of the mobile terminals; and determining the typical data as the same group when the correlation coefficient is equal to or larger than a predetermined first threshold and further when a variation coefficient is equal to or smaller than a predetermined second threshold.

11. An analysis device comprising:

a typical data creation unit configured to acquire measurement information of a reception signal state measured by a measuring instrument, acquire, together with terminal type information, measurement information of a reception signal state measured by mobile terminals, statistically process the measurement information of the measuring instrument and the measurement information of the mobile terminals for each terminal type, generate respective typical data, and group similar pieces of the typical data of the measuring instrument and the typical data of the mobile terminals for each terminal type into the same group; and a measurement representative value generation unit configured to generate a distribution of measurement representative values on the basis of a distribution of the typical data included in the same group and a distribution of the terminal types in the group; and an optimum value calculation unit configured to calculate a setting optimum value for optimization of a network device;

an optimum value setting unit to output the setting optimum value to the network device.

12. The analysis device according to claim 11, wherein the measurement representative value generation unit creates a population distribution of the terminal types and synthesizes a distribution of the measurement representative values on the basis of the distribution of the typical data of the same group and the population distribution of the terminal types in the group.

13. The analysis device according to claim 11 further comprising a data storage management unit configured to store a data structure including at least measurement information associated with a number of times of measurements per row and a plurality of the rows in chronological order on a storage device by being associated with the measuring instrument and the terminal types of the mobile terminals, wherein the typical data creation unit determines, for measurement information of a plurality of numbers of times stored in a certain row, an average value of a specific number of pieces of measurement information satisfying a condition in which a statistical characteristic in a predetermined chronological interval is previously determined, executes processing for determining the average value as the typical data in association with the measuring instrument and the terminal types of the mobile terminals, and generates typical data of the measuring instrument and typical data of the mobile terminals for each terminal type.

14. The analysis device according to claim 13, wherein the data structure includes measurement points and components of measurement information by being associated with a number of times of measurements per row, and the measurement point is identified by a sector obtained by dividing a cell controlled by a base station or a distance from the base station.

15. The analysis device according to claim 13, wherein the typical data creation unit calculates an average and a standard deviation of measurement information stored in the same column in the data structure, for each row of the data structure, extracts a predetermined specific number of columns in which the average and the standard deviation of measurement information in the same column direction fall within predetermined specific ranges, respectively, from measurement information of a plurality of numbers of times stored in the row, executes processing for determining an average of measurement information of the extracted specific number of columns extracted from the measurement information of a plurality of numbers of times stored in the row as typical data corresponding to the row by being associated with the measuring instrument and the terminal types of the mobile terminals, generates typical data of the measuring instrument and typical data of the mobile terminals for each terminal type, calculates a correlation coefficient of the typical data between the measuring instrument and the terminal types of the mobile terminals, and groups, when the correlation coefficient is equal to or larger than a predetermined threshold, the typical data into one group.

16. The analysis device according to claim 11, wherein the measurement representative value generation unit creates a population distribution of the terminal types, determines, when a domination rate of a group to which the measuring instrument belongs exceeds a predetermined specific value, a measurement value of the group to which measurement information of the measuring instrument belongs as the measurement representative value, determines, when a domination rate of a group to which the measuring instrument belongs is equal to or smaller than the predetermined specific value, an average value and a standard deviation of the typical data of the terminal types for each group, synthesizes a frequency distribution in accordance with a population distribution of the terminal types in the group, and generates a distribution of the measurement representative values.

17. The analysis device according to claim 16 further comprising an input unit configured to input an analysis condition inside or outside the device, the input unit inputting at least one of the threshold for determining that a reception characteristic is similar for the correlation coefficient between the measuring instrument and the terminal types of the mobile terminals or the threshold for a domination rate of a distribution of the measuring instrument.

18. The analysis device according to claim 11, wherein the typical data creation unit handles at least one mobile terminal of a plurality of the mobile terminals as the measuring instrument and determines measurement information of a reception signal state measured by the at least one mobile terminal as measurement information of the measuring instrument.

19. The analysis device according claim 11, wherein the typical data creation unit handles the measuring instrument as a mobile terminal further different in terminal type and determines measurement information of a reception signal state measured by the measuring instrument as measurement information of the mobile terminal further different in terminal type.

20. The analysis device according to claim 11, wherein the typical data creation unit handles the mobile terminal grouped into the same group as the measuring instrument as the measuring instrument and uses typical data of the measuring instrument as typical data of the mobile terminal.

21. The analysis device according to claim 11, wherein the typical data creation unit calculates, upon the grouping, a correlation coefficient of the typical data between the measuring instrument and the terminal types of the mobile terminals and determines the typical data as the same group when the correlation coefficient is equal to or larger than a predetermined first threshold and further when a variation coefficient is equal to or smaller than a predetermined second threshold.

22. A mobile communication network system comprising:
mobile terminals;
a base station wirelessly communicating with the mobile terminals; and
the analysis device according to claim 11 communicably connected to the base station.

23. A base station comprising the analysis device according to claim 11, the base station wirelessly communicating with mobile terminals.

24. A control station comprising the analysis device according to claim 20, the control station controlling a base station that wirelessly communicates with mobile terminals.

25. A computer-readable, non-transitory recording medium recording a program causing a computer to execute:
   typical data creation processing for acquiring measurement information of a reception signal state measured by a measuring instrument, acquiring, together with terminal type information, measurement information of a reception signal state measured by mobile terminals, statistically processing the measurement information of the measuring instrument and the measurement information of the mobile terminals for each terminal type, generating respective typical data, and grouping similar pieces of the typical data of the measuring instrument and the typical data of the mobile terminals for each terminal type into the same group; and
   measurement representative value generation processing for generating a distribution of measurement representative values on the basis of a distribution of the typical data included in the same group and a distribution of the terminal types in the group; and
   an optimum value calculation processing for calculating a setting optimum value for optimization of a network device;
   an optimum value setting processing for outputting the setting optimum value to the network device.

26. The recording medium according to claim 25, wherein the measurement representative value generation processing creates a population distribution of the terminal types and synthesizes a distribution of the measurement representative values on the basis of the distribution of the typical data of the same group and the population distribution of the terminal types in the group.

27. The recording medium according to claim 25, further recording a program causing the computer to execute data storage management processing for storing a data structure including at least measurement information associated with a number of times of measurements per row and a plurality of the rows in chronological order on a storage device by being associated with the measuring instrument and the terminal types of the mobile terminals, wherein
   the typical data creation processing executes processing for determining, as typical data, an average value of a specific number of pieces of measurement information satisfying a condition in which a statistical characteristic is previously determined, among measurement information of a plurality of numbers of times stored in a certain row in association with the measuring instrument and the terminal types of the mobile terminals, and generates typical data of the measuring instrument and typical data of the mobile terminals for each terminal type.

28. The recording medium according to claim 25, further recording a program causing the computer to execute:
   setting optimum value calculation processing for determining a setting optimum value of a network parameter from the measurement representative value distribution calculated in the measurement representative value generation processing; and
   setting optimum value output processing for outputting the setting optimum value.

* * * * *